(12) United States Patent
Kurasawa

(10) Patent No.: US 11,301,194 B2
(45) Date of Patent: Apr. 12, 2022

(54) TERMINAL APPARATUS, METHOD OF CONTROLLING THE SAME, AND STORAGE MEDIUM

(71) Applicant: CANON KABUSHIKI KAISHA, Tokyo (JP)

(72) Inventor: Kanto Kurasawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/879,846

(22) Filed: May 21, 2020

(65) Prior Publication Data
US 2020/0379700 A1    Dec. 3, 2020

(30) Foreign Application Priority Data

May 31, 2019 (JP) .............................. JP2019-103179

(51) Int. Cl.
*G06F 3/12* (2006.01)
*H04W 4/80* (2018.01)
*H04W 4/02* (2018.01)

(52) U.S. Cl.
CPC .......... *G06F 3/1292* (2013.01); *G06F 3/1204* (2013.01); *H04W 4/023* (2013.01); *H04W 4/80* (2018.02)

(58) Field of Classification Search
CPC .... G06F 3/1292; G06F 3/1204; G06F 3/0482; G06F 3/04847; G06F 3/1229; G06F 3/121; G06F 3/20; H04W 4/80; H04W 4/023; G01S 5/02; G01S 5/04; G01S 2205/01; G01S 5/0284; G01S 1/08; G01S 3/48

USPC ....................................................... 358/1.15
See application file for complete search history.

(56) References Cited

U.S. PATENT DOCUMENTS

| | | | |
|---|---|---|---|
| 2014/0211246 A1* | 7/2014 | Okuno | H04L 67/18 358/1.15 |
| 2014/0240776 A1* | 8/2014 | Suzuki | G06F 3/1296 358/1.15 |
| 2017/0038923 A1 | 2/2017 | Tsuzuki | |
| 2019/0004753 A1* | 1/2019 | Chu | G06F 3/1239 |
| 2019/0075212 A1* | 3/2019 | Yokoyama | H04N 1/00307 |
| 2021/0070175 A1* | 3/2021 | Shimotani | G02F 1/133526 |

FOREIGN PATENT DOCUMENTS

JP         2017-037427 A     2/2017

* cited by examiner

*Primary Examiner* — Marcus T Riley
*Assistant Examiner* — Darryl V Dottin
(74) *Attorney, Agent, or Firm* — Venable LLP

(57) ABSTRACT

A terminal apparatus capable of communicating with a communication apparatus specifies a first distance between the terminal apparatus and a first unit in the communication apparatus and a second distance between the terminal apparatus and a second unit in the communication apparatus, and causes a display unit to display a first screen which relates to the first unit in preference to a second screen which relates to the second unit and display the second screen based on an operation of the first screen displayed in preference to the second screen in a case where the first distance is shorter than the second distance, and display the second screen in preference to the first screen and display the first screen based on an operation of the second screen displayed in preference to the first screen in a case where the second distance is shorter than the first distance.

15 Claims, 17 Drawing Sheets

FIG. 15

[WITHDRAWAL REQUEST] UI START

↓

UI DISPLAY WITH "INSTRUCTION TO WITHDRAW FROM TARGET UNIT" POP-UP AND [WITHDRAWAL COMPLETE] AND [CANCEL] BUTTONS — S300

↓

S301 — IS BUTTON PRESSED?
- [CANCEL] IS PRESSED → S320 TRANSMIT [OPERATION CANCEL] → [WITHDRAWAL REQUEST] UI END
- [WITHDRAWAL COMPLETE] IS PRESSED ↓

S310 — OBTAIN RELATIVE POSITIONS (DISTANCE AND ANGLE) OF INFORMATION PROCESSING APPARATUS AND PRINTING APPARATUS

↓

S311 — COULD POSITION INFORMATION BE OBTAINED?
- NO → (back to S301)
- YES ↓

S312 — HAS TERMINAL SEPARATED BY PREDETERMINED DISTANCE OR MORE FROM NEAR UNIT TO BE WITHDRAWN FROM?
- NO → (back to S301)
- YES ↓

S330 — TRANSMIT [WITHDRAWAL COMPLETE]

↓

[WITHDRAWAL REQUEST] UI END

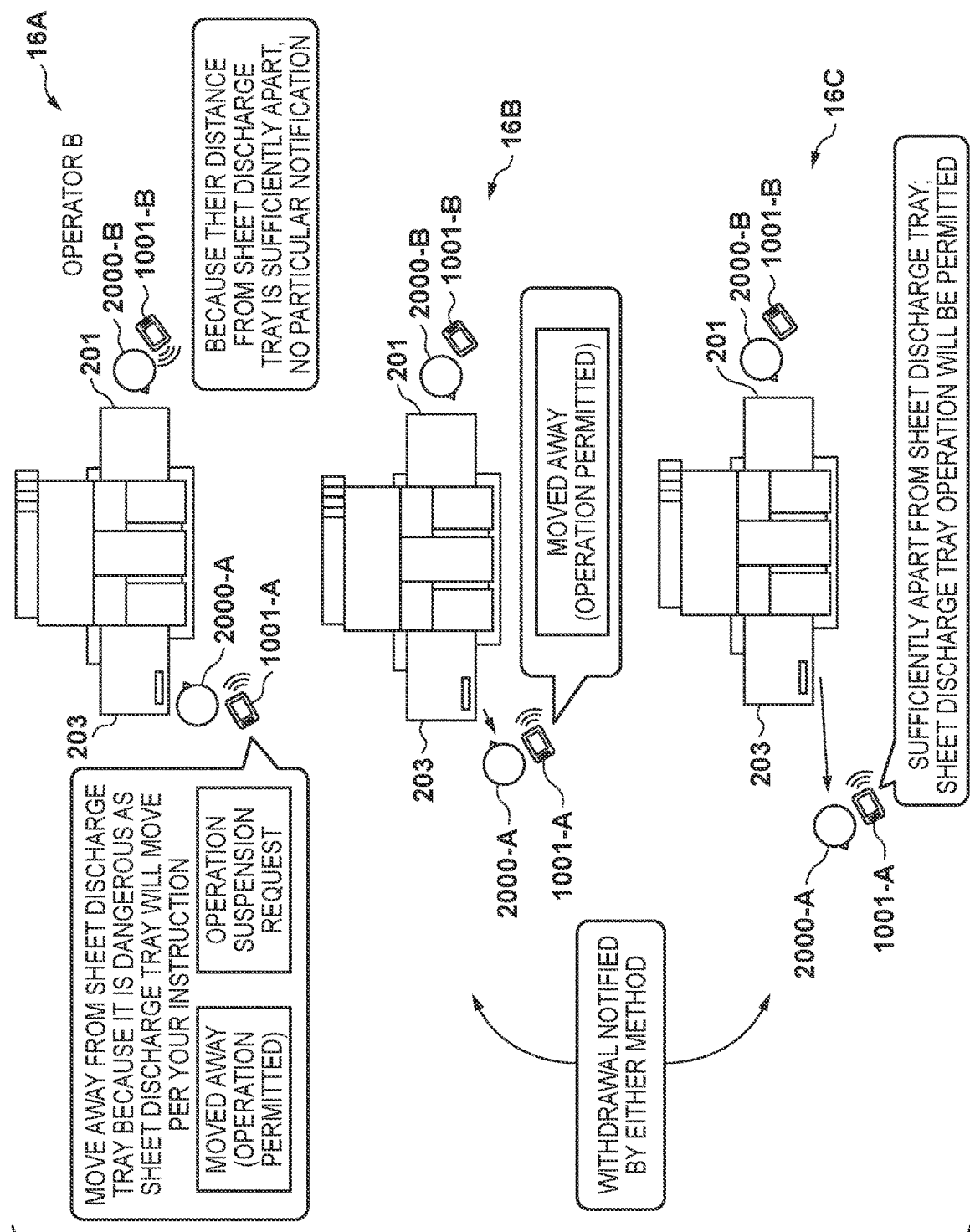

| TERMINAL | OPERATION | |
|---|---|---|
| TERMINAL 1001-B: WORK ON SHEET DISCHARGE TRAY 201 | | WORK END |
| TERMINAL 1001-A: WORK ON SHEET DISCHARGE TRAY 203 | | WORK END |
| TERMINAL 1001-C: --- | | |

| TERMINAL | OPERATION | |
|---|---|---|
| TERMINAL 1001-B: WORK ON SHEET DISCHARGE TRAY 201 | | WORK END |
| TERMINAL 1001-A: WORK ON SHEET DISCHARGE TRAY 203 | | WORK END |
| TERMINAL 1001-C: --- | | |

TERMINAL APPARATUS, METHOD OF CONTROLLING THE SAME, AND STORAGE MEDIUM

BACKGROUND OF THE INVENTION

Field of the Invention

The present invention relates to a terminal apparatus, a method of controlling the same, and a storage medium.

Description of the Related Art

There is a technique for specifying the distances between devices using Bluetooth communication (see Japanese Patent Laid-Open No. 2017-037427).

However, more accurate position detection techniques are required. In Bluetooth 5.1, a direction can be detected using an Angle of Arrival (AoA) or an Angle of Departure (AoD). Thus, the relative positional relationship with respect to a certain device can be known, and for example, the relative position between two nearby Bluetooth devices can be specified with an error of several centimeters.

SUMMARY OF THE INVENTION

The present invention provides a more productive system that uses a technique capable of accurately specifying relative positions between devices. More specifically, the present invention provides a mechanism for reducing the downtime of an apparatus by reducing the movement time between modules of an operator, making a warning only for an operator in the vicinity of an operating module, and confirming that they have withdrawn from the apparatus.

In accordance with one aspect of the present invention, there is provided a terminal apparatus capable of communicating with a communication apparatus, comprising: a specifying unit configured to specify a first distance between the terminal apparatus and a first unit in the communication apparatus, and a second distance between the terminal apparatus and a second unit in the communication apparatus; and a display control unit configured to cause a display unit to display a first message which relates to the first unit in preference to a second message which relates to the second unit in a case where the first distance is shorter than the second distance in a situation of preparing the communication apparatus, and display the second message in preference to the first message in a case where the second distance is shorter than the first distance in the situation of preparing the communication apparatus.

According to the present invention, a mechanism for prompting an operator to perform efficient work can be provided.

Further features of the present invention will become apparent from the following description of exemplary embodiments with reference to the attached drawings.

BRIEF DESCRIPTION OF THE DRAWINGS

FIG. 15 is a flowchart of a withdrawal request UI.

FIG. 16 shows examples of operation when an operator who has issued a unit operation instruction is near an operation unit.

DESCRIPTION OF THE EMBODIMENTS

Figure 1:
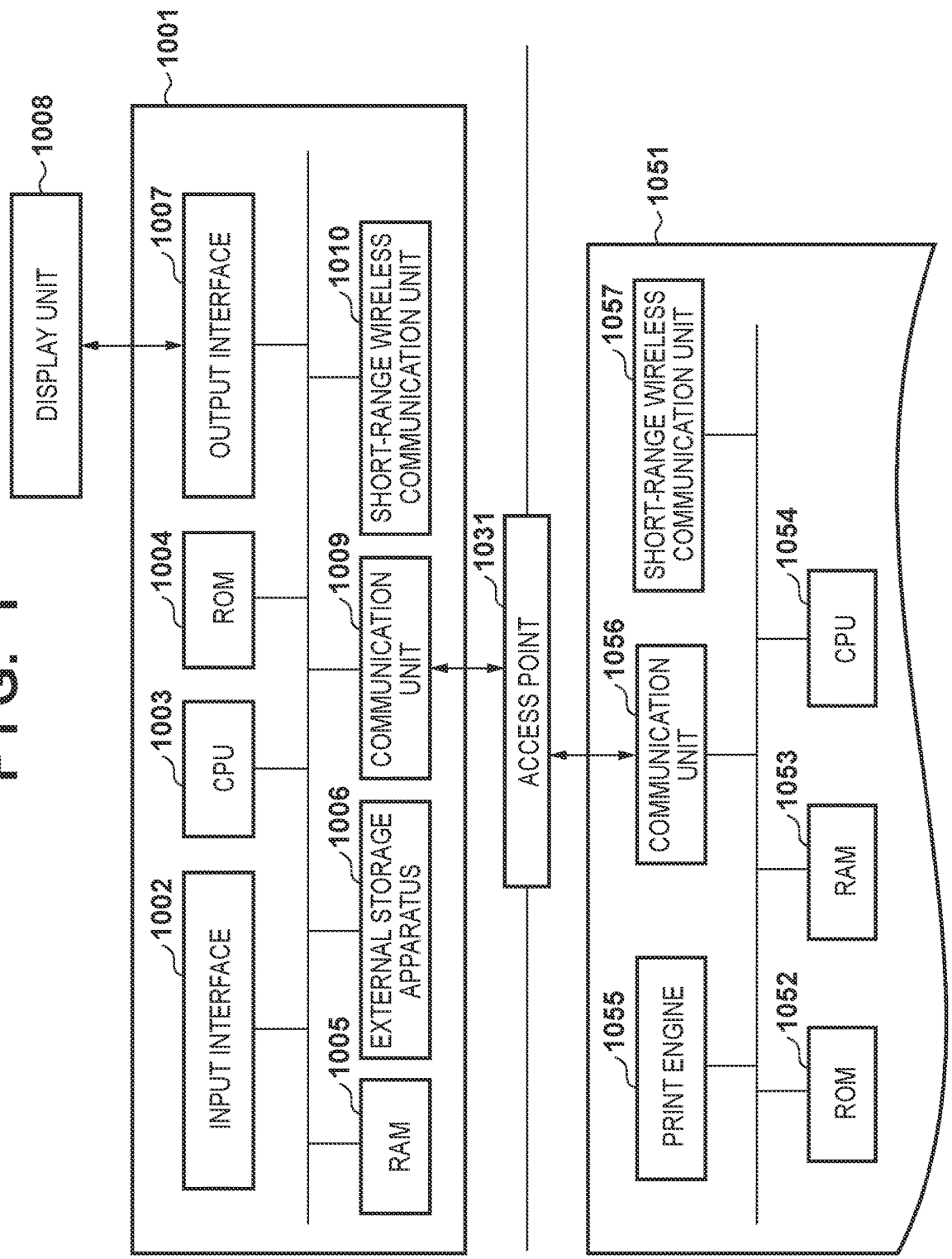
FIG. 1 shows a configuration of an information processing apparatus and a communication apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

Configuration of Communication System

An information processing apparatus and a communication apparatus included in a communication system of the present embodiment will be described. Although a smart phone is exemplified in the present embodiment as the information processing apparatus, there is no limitation to this, and application can be made to various devices such as a portable terminal, a notebook PC, a tablet terminal, a PDA (Personal Digital Assistant), and a digital camera. In addition, although a printer is exemplified in the present embodiment as the communication apparatus, there is no limitation to this, and various apparatuses can be applied as long as they are capable of performing wireless communication with the information processing apparatus. For example, in the case of a printer, application can be made to an inkjet printer, a full-color laser beam printer, a monochrome printer, or the like. In addition, application can be made not only to a printer but also to a copying machine, a facsimile machine, a portable terminal, a smart phone, a notebook PC, a tablet terminal, a PDA, a digital camera, a music playback device, a television, and the like. In addition, it can be applied to a multifunction machine with a plurality of functions such as a copying function, a fax function, and print function.

First, the configurations of the information processing apparatus of the present embodiment and a communication apparatus capable of communicating with the information processing apparatus of the present embodiment will be described with reference to the block diagram of FIG. 1. Although the following configuration is described as an example in the present embodiment, the present embodiment can be applied in relation to an apparatus capable of communicating with a communication apparatus, and functionality is not particularly limited to what is shown in the figure.

An information processing apparatus 1001 is an information processing apparatus of the present embodiment. The information processing apparatus 1001 includes an input interface 1002, a CPU 1003, a ROM 1004, a RAM 1005, an external storage apparatus 1006, an output interface 1007, a display unit 1008, a communication unit 1009, a short-range wireless communication unit 1010, and the like.

The input interface 1002 is an interface for accepting data input and operation instructions from a user and is configured by a physical keyboard, a button, a touch panel, or the like. Note that configuration may be taken to have a form in which the output interface 1007 and the input interface 1002, which will be described later, have an integrated configuration such as with a touch panel, and output of screens and acceptance of operations from the user is performed by a single device.

The CPU 1003 is a system control unit which executes programs to control the entire information processing apparatus 1001.

The ROM 1004 stores fixed data such as a control program that is executed by the CPU 1003, a data table, and an embedded operating system (OS) program. In the present embodiment, the control programs stored in the ROM 1004 perform software execution control such as scheduling, task switches, and interrupt processing under the management of the embedded OS stored in the ROM 1004.

The RAM 1005 is configured by, for example, an SRAM (Static Random Access Memory) which requires a backup power supply. Note that, since data is held in accordance with a primary battery for data backup (not shown), the RAM 1005 can store important data such as program control variables without making the important data be volatile. A memory area for storing the setting information of the information processing apparatus 1001 and the management data of the information processing apparatus 1001 is also provided in the RAM 1005. The RAM 1005 is also used as the main memory and the work memory of the CPU 1003.

The external storage apparatus 1006 stores a printing application that provides a print execution function, a printing information generation program that generates printing information that can be interpreted by an a communication apparatus 1051, and the like. Further, the external storage apparatus 1006 stores various programs such as an information transmission/reception control program to be transmitted and received to and from the communication apparatus 1051 connected via the communication unit 1009, and various information used by these programs.

The output interface 1007 is an interface through which the display unit 1008 performs control for displaying data or making a notification of the state of the information processing apparatus 1001.

The display unit 1008 is configured by an LED (light emitting diode) or an LCD (liquid crystal display) or the like, and performs display of data and notification of the state of the information processing apparatus 1001. Incidentally, an input from a user through the display unit 1008 may be accepted by providing, on the display unit 1008, a soft keyboard comprising a key such as a power key, a numerical value input key, a mode setting key, a determination key, and a cancel key.

The communication unit 1009 is connected to an apparatus such as the communication apparatus 1051 and has a configuration for executing data communication. For example, the communication unit 1009 can be connected to an access point (not shown) in the communication apparatus 1051. By connecting the communication unit 1009 and the access point in the communication apparatus 1051, the information processing apparatus 1001 and the communication apparatus 1051 can communicate with each other. The communication unit 1009 may directly communicate with the communication apparatus 1051 by wireless communication, or may communicate via an external access point (access point 131) that is present outside of the information processing apparatus 1001 and the communication apparatus 1051. The wireless communication method may be, for example, Wi-Fi (Wireless Fidelity) (registered trademark), Bluetooth (registered trademark), or the like. Further, the access point 131 includes, for example, a device such as a wireless LAN router. In the present embodiment, a method in which the information processing apparatus 1001 and the communication apparatus 1051 are directly connected without going through an external access point is referred to as a direct connection method. The method by which the information processing apparatus 1001 and the communication apparatus 1051 are connected to each other via an external access point is referred to as an infrastructure connection method.

The short-range wireless communication unit 1010 is configured to wirelessly connect to an apparatus such as the communication apparatus 1051 at short range to execute data communication, and performs communication by a communication method different from that of the communication unit 1009. The short-range wireless communication unit 1010 can connect to a short-range wireless communication unit 1057 in the communication apparatus 1051. In the present embodiment, it is assumed that Bluetooth 5.1 is used as the communication method of the short-range wireless communication unit 1010. Note that Bluetooth 5.1 includes both Classic Bluetooth and Bluetooth Low Energy (BLE) standards, but in the present embodiment, it is assumed that BLE is used as the communication method of the short-range wireless communication unit 1057.

The communication apparatus 1051 is a communication apparatus of the present embodiment. The communication apparatus 1051 includes a ROM 1052, a RAM 1053, a CPU 1054, a print engine 1055, a communication unit 1056, a short-range wireless communication unit 1057, and the like.

The communication unit 1056 has an access point for connecting to an apparatus such as the information processing apparatus 1001 as an access point that is inside the communication apparatus 1051. The access point can connect to the communication unit 1009 of the information processing apparatus 1001. The communication unit 1056 may directly communicate with the information processing apparatus 1001 by wireless communication or may communicate via the access point 131. Examples of the communication method include Wi-Fi (registered trademark), Bluetooth (registered trademark), and the like. The communication unit 1056 may be provided with hardware that functions as an access point, or may operate as an access point in accordance with software for functioning as an access point.

The short-range wireless communication unit 1057 has a configuration for wirelessly connecting at short range to an apparatus such as the information processing apparatus 1001. In the present embodiment, it is assumed that Bluetooth 5.1 is used as the communication method of the short-range wireless communication unit 1057. More specifically, in the present embodiment, it is assumed that BLE is used as the communication method of the short-range wireless communication unit 1057.

The RAM 1053 is configured by an SRAM or the like that requires a backup power supply. Note that, since data is held in accordance with a primary battery for data backup (not shown), the RAM 1053 can store important data such as program control variables without making the important data be volatile. A memory area for storing the setting information of the communication apparatus 1051 and the management data of the communication apparatus 1051 is also provided in the RAM 1053. The RAM 1053 is also used as a main memory and a work memory of the CPU 1054, and stores various types of information and a reception buffer for temporarily storing printing information received from the information processing apparatus 1001 or the like.

The ROM 1052 stores fixed data such as a control program that is executed by the CPU 1054, a data table, and an OS program. In the present embodiment, the control programs stored in the ROM 1052 perform software execution control such as scheduling, task switches, and interrupt processing under the management of the embedded OS stored in the ROM 1052.

The CPU 1054 is a system control unit, and controls the entirety of the communication apparatus 1051.

Based on the information stored in the print engine 1055 and the RAM 1053 and a print job received from the information processing apparatus 1001 or the like, an image is formed on a printing medium such as a sheet using a printing agent such as ink, and a printing result is outputted. At this time, the print job which is transmitted from the information processing apparatus 1001 or the like is received via the communication unit 1056 which can communicate at a higher speed than the short-range wireless communication unit 1057 because there is a large transmission data amount and high-speed communication is required.

The communication apparatus 1051 may be equipped with a memory such as an external HDD or an SD card as an optional device, and information stored in the communication apparatus 1051 may be stored in the memory.

Further, the communication apparatus of the present embodiment sets the connection mode by the connection setting process and performs communication with the information processing apparatus according to a connection configuration based on the connection mode that is set. The communication apparatus according to the present embodiment sets the infrastructure connection mode as the connection mode when communication is performed through an infrastructure connection, and sets the direct connection mode as the connection mode when communication is performed through a direct connection.

Here, a division of processing between the information processing apparatus 1001 and the communication apparatus 1051 is indicated as described above as an example, but there is no particular limitation to this mode of division, and other modes may be used.

Further, in the present embodiment, configuration may be such that either or both of the communication unit 1009 and the communication unit 1056 is not provided, and the information processing apparatus 1001 and the communication apparatus 1051 connect only by a wireless connection via the short-range wireless communication unit 1010 and the short-range wireless communication unit 1057.

In the present embodiment, it is assumed that the information processing apparatus 1001 stores a predetermined application in the ROM 1004, an external storage apparatus 1006, or the like. The predetermined application is, for example, an application program for transmitting to the communication apparatus 1051 a print job for printing image data or document data in the information processing apparatus 1001. An application having such a function is referred to as the printing application after this. The printing application may have other functions in addition to the print function. For example, when the communication apparatus 1051 has an image scanning function, the printing application may have a function of scanning a document set in the communication apparatus 1051, a function of performing other settings of the communication apparatus 1051, a function of confirming the state of the communication apparatus 1051, and the like. That is, the printing application may have a function that transmits an image scan job or a setting job to the communication apparatus 1051 in addition to the print job. The predetermined application may be an application program having a function other than printing, and is not limited to a printing application.

BLE Frame Format

In the present embodiment, the short-range wireless communication unit 1010 and the short-range wireless communication unit 1057 will be described as performing communication by BLE. In the present embodiment, the short-range wireless communication unit 1057 functions as an advertiser (or slave) that broadcasts advertisement information, which will be described later, and the short-range wireless communication unit 1010 functions as a scanner (or master) that receives advertisement information. Description is given by assuming that the communication unit 1009 and the communication unit 1056 communicate with each other via a wireless LAN (Wi-Fi). Hereinafter, a combination of transmission processing and reception processing of advertisement information in accordance with a predetermined channel is referred to as advertisement.

Figure 2A:
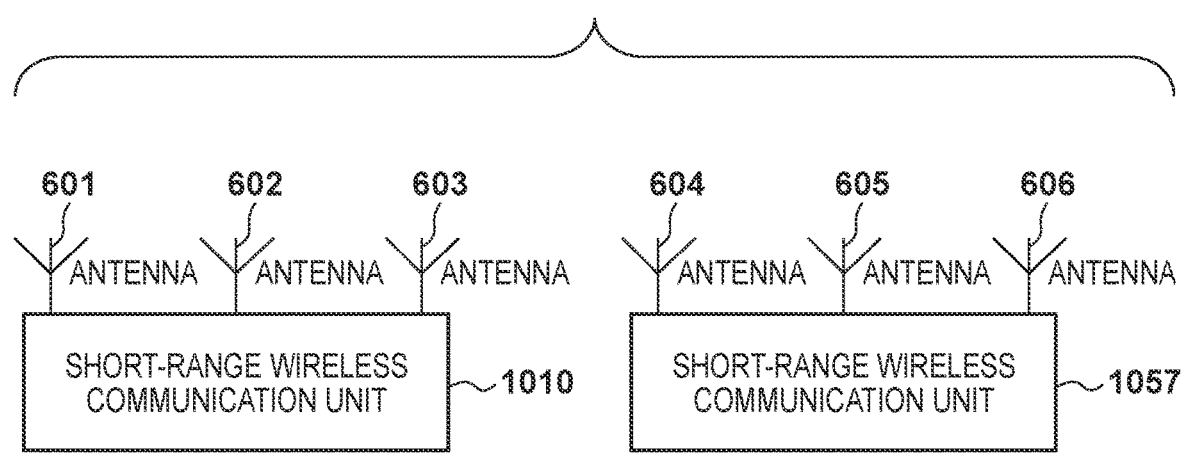
FIG. 2A and FIG. 2B show a configuration of a short-range wireless communication unit for a case of direction detection in BLE.

FIG. 2A is a block diagram for describing a function of the information processing apparatus 1001 to detect the direction of the communication apparatus 1051 using advertisement information transmitted by the short-range wireless communication unit 1057 in the communication apparatus 1051. The short-range wireless communication unit 1010 in the information processing apparatus 1001 includes an antenna 601, an antenna 602, and an antenna 603, and the short-range wireless communication unit 1057 in the communication apparatus 1051 includes an antenna 604, an antenna 605, and an antenna 606. Note that there is no limitation on the number of antennas provided in the short-range wireless communication unit 1010 and the short-range wireless communication unit 1057. The number of antennas may be one, two, or four or more. In addition the numbers of antennas provided in the short-range wireless communication unit 1010 and the short-range wireless communication unit 1057 may be respectively different. Further, in FIG. 2A, although the antennas provided in the short-range wireless communication unit 1010 and the short-range wireless communication unit 1057 are described as being arranged in a straight line, there is no limitation on the arrangement of the antennas. For example, if the communication apparatus is a rectangular parallelepiped, an antenna may be installed at each of the eight vertices.

Figure 2B:
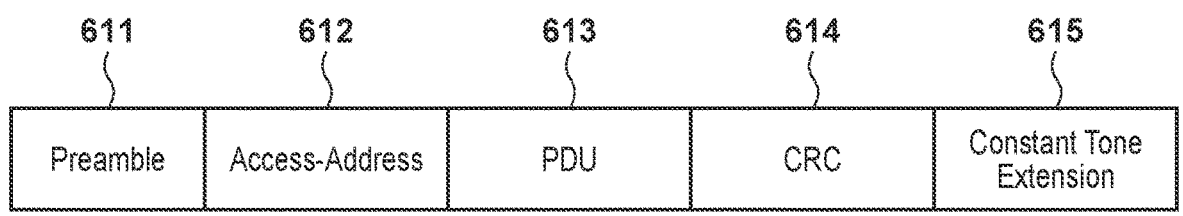

FIG. 2B shows examples of a BLE frame format used when the short-range wireless communication unit 1057 of the communication apparatus 1051 transmits a signal such as advertisement information. In a Preamble 611 is stored a bit string used to take a timing in units of bits for this frame, for an apparatus that receives this frame. In an Access-Address 612 is stored a bit string used to take a timing in units of bytes for this frame, for an apparatus that receives this frame. The information processing apparatus 1001 can read the content of a subsequent PDU that follows by establishing timing synchronization using the Preamble 611 and the Access-Address 612. The actual data of the advertisement information which is transmitted by the communication apparatus 1051 is stored in a PDU 613. The advertisement information, which includes a header and a payload, is stored in the PDU 613. An error-detecting code value during the PDU 613 communication is stored in a CRC 614. In a Constant Tone Extension (CTE 615) is arranged a tone used to detect the direction of the communication apparatus 1051 with respect to the information processing apparatus 1001. In the CTE 615, for example, the short-range wireless communication unit 1010 may store some kind of information for estimating the position of the short-range wireless communication unit 1057.

Detecting Device Orientation

Figure 3:
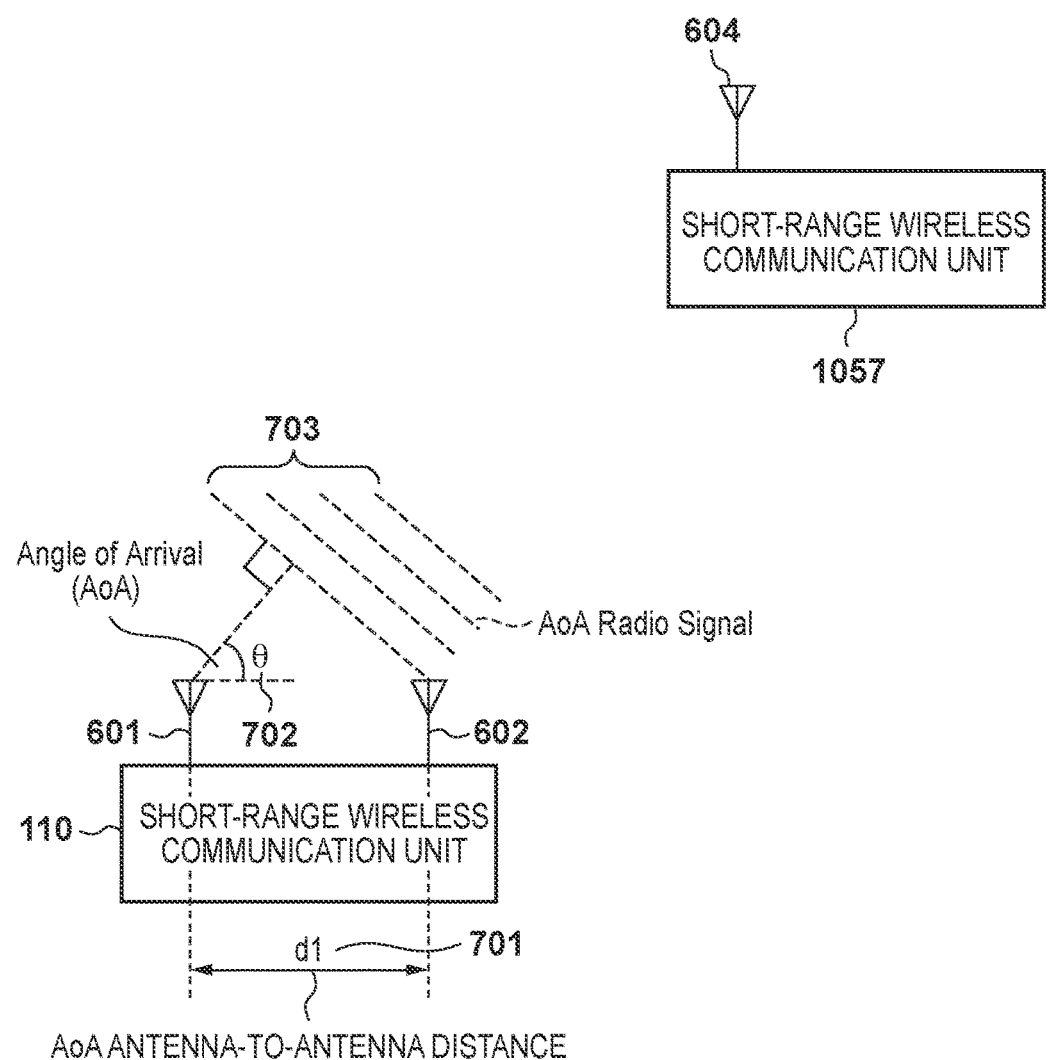
FIG. 3 shows a configuration in which a plurality of antennas are provided on an advertisement receiving side when direction detection is performed in BLE.

With reference to FIG. 3, a method will be described in which the information processing apparatus 1001 detects the direction of the communication apparatus 1051, which is realized by the short-range wireless communication unit 110 comprising a plurality of antennas.

Methods by which the information processing apparatus 1001 estimates the direction of the communication apparatus 1051 are classified into (1) a method implemented when the short-range wireless communication unit 1010 (receiving side) has a plurality of antennas, and (2) a method implemented when the short-range wireless communication unit 1057 has a plurality of antennas. The method (1) will be described with reference to FIG. 3. In the configuration of FIG. 3, the short-range wireless communication unit 1010 estimates the angle of arrival of received radio waves based on a phase difference between radio waves when they arrive at the respective antennas, using the plurality of antennas of the short-range wireless communication unit 1010 which is apparatus on the receiving side. Hereinafter, the angle of arrival may be referred to as "AoA".

In FIG. 3, the short-range wireless communication unit 1057 transmits advertisement information by a wireless frame (AoA Radio Signal 703) that includes a CTE 615 using the antenna 604. The short-range wireless communication unit 1010 receives the wireless frame at a plurality of antennas (both the antenna 601 and the antenna 602). At this time, assume that the antenna-to-antenna distance 701 of the antenna 601 and the antenna 602 is d1, and the AoA 702 is θ. In this case, the radio waves received by the antenna 601 are received after crossing a distance that is d1×cos(θ) longer than that for the radio waves received by the antenna 602. Therefore, letting the wavelength of the radio waves be λ, the phase of the radio waves received by the antenna 601 is delayed by, with respect to the phase of the radio waves received by the antenna 602, only:

$$\psi1=2\pi\times(d1\times\cos(\theta)/\lambda) \qquad \text{Equation (1)}$$

Here, ψ1 is the difference between the phase of the radio wave received by the antenna 602 and the phase of the radio wave received by the antenna 601. From Equation (1), AoA 702 can be calculated with:

$$\theta=\arccos((\psi1\times\lambda)/(2\pi\times d1)) \qquad \text{Equation (2).}$$

Therefore, the information processing apparatus 1001 can estimate the direction of the communication apparatus 1051 by performing the calculation as shown in Equation (2).

Figure 4:
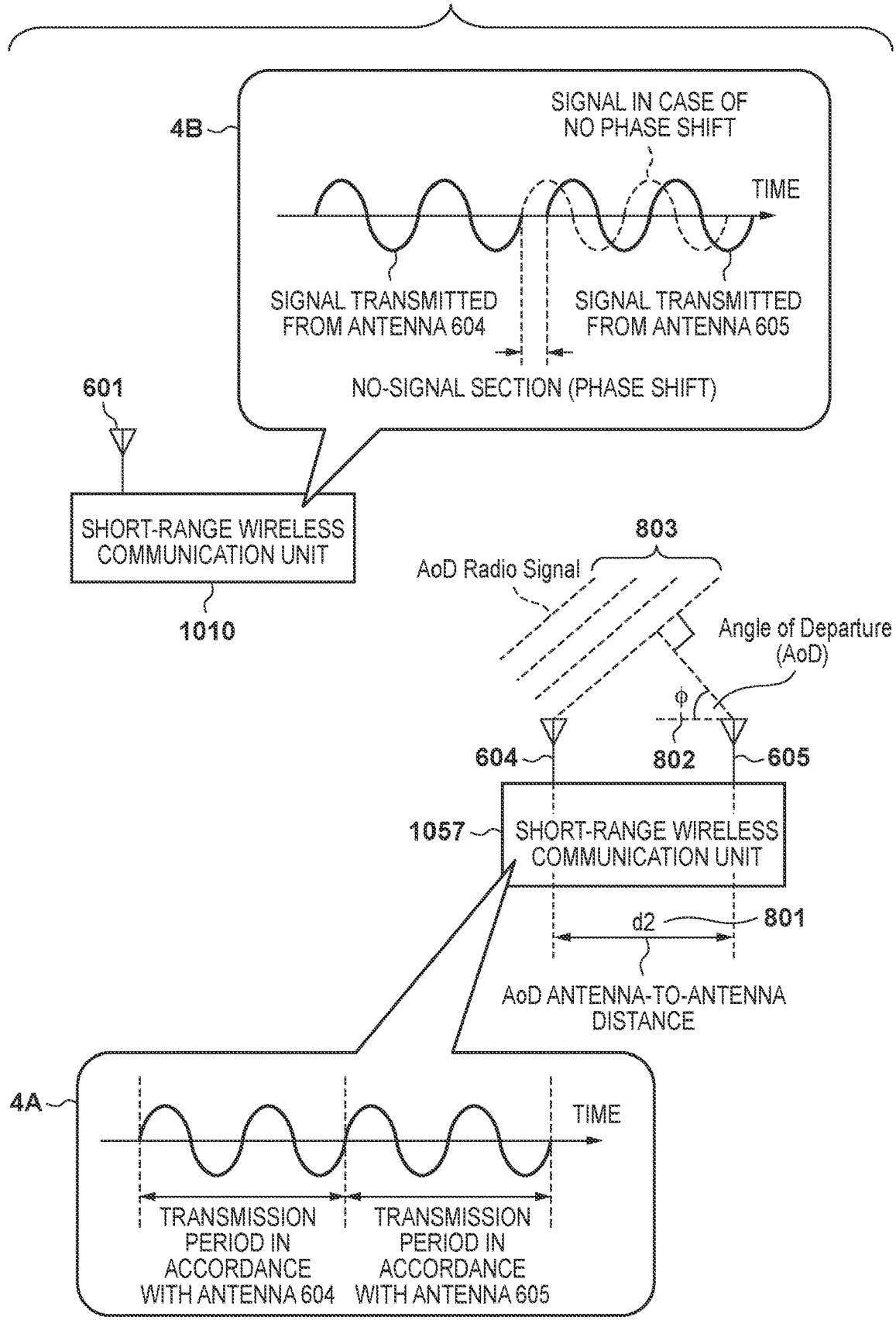
FIG. 4 shows a configuration in which a plurality of antennas are provided on an advertisement transmitting side when direction detection is performed in BLE.

Next, the method (2) will be described with reference to FIG. 4. In the configuration of FIG. 4, advertisement information is transmitted in accordance with a wireless frame (AoD Radio Signal 803) that includes a CTE 615 at respectively different periods from a plurality of antennas of the short-range wireless communication unit 1057, which is a transmission side apparatus. For example, as shown in (A) in FIG. 4, the transmission period of AoD Radio Signal 803 by the antenna 604 is set, and it is assumed that the transmission period of AoD Radio Signal 803 by the antenna 605 is set immediately thereafter. In this case, in the short-range wireless communication unit 1057, between the transmission of the AoD Radio Signal 803 by the antenna 604 and the transmission of the AoD Radio Signal 803 by the antenna 605, a no-signal section does not occur. In contrast, the short-range wireless communication unit 1010 may receive these wireless signals in a form such as (B) in FIG. 4. That is, because the signal transmitted from the antenna 605 goes through a longer path than the signal transmitted from the antenna 604 to arrive at the short-range wireless communication unit 1010 delayed, a no-signal section between these signals occurs. Further, if the antenna 605 transmits the signal first, before all of the signal transmitted from the antenna 605 arrives at the short-range wireless communication unit 1010, the signal transmitted from the antenna 604 will reach the short-range wireless communication unit 1010. Also, in a case where a no-signal section of a predetermined length is set after the completion of a signal transmission period of the antenna 604 and a period of signal transmission from the antenna 605 is set, in the wireless signal received in the short-range wireless communication unit 1010, a no-signal section longer than the predetermined length is observed. Similarly, in a case where a no-signal section of a predetermined length is set after the completion of a signal transmission period of the antenna 605 and a period of signal transmission from the antenna 604 is set, in the wireless signal received in the short-range wireless communication unit 1010, a no-signal section shorter than the predetermined length is observed. In this way, signals transmitted from a plurality of antennas are observed as a deviation of timings in accordance with each path length in the short-range wireless communication unit 1010. Note that due to the observation of a deviation in timings, information on scheduling as to which signal is transmitted from which antenna and at which timing (for example, from the short-range wireless communication unit 1057 or another apparatus) is notified to the short-range wireless communication unit 1010 in advance.

Incidentally, a deviation in reception timings corresponds to a deviation in phases of the reception signal. For example, in the example of FIG. 4, the signal transmitted from the antenna 605 travels along a path d2×cos(φ) longer than that of the signal transmitted from the antenna 604, and arrives at the short-range wireless communication unit 1010. Here d2 is the antenna-to-antenna distance 801 between the antenna 604 and the antenna 505. Letting the propagation speed of light be c, by this difference in path length, a reception timing deviation of d2×cos(φ)/c occurs, but simultaneously, only the following phase difference occurs:

$$\psi 2 = 2\pi \times d2 \times \cos(\varphi)/\lambda \qquad \text{Equation (3).}$$

As described above, λ is the wavelength of the radio wave. Further, φ is an angle formed between a straight line connecting the short-range wireless communication unit 1057 and the short-range wireless communication unit 1010, and a straight line connecting the antenna 604 and the antenna 605. This angle is called an Angle of Departure, and is hereinafter referred to as an AoD 802. The short-range wireless communication unit 1010 can specify the phase difference ψ2 by, for example, performing correlation detection on the basis of the first received signal among the plurality signals transmitted from the short-range wireless communication unit 1057 or the like. Then, the short-range wireless communication unit 1010 can use the phase difference ψ2 from Equation (3) to calculate the AoD 802:

$$\varphi = \arccos((\psi 2 \times \lambda)/(2\pi \times d2)) \qquad \text{Equation (4).}$$

Incidentally, the short-range wireless communication unit 1010 obtains, in advance, the information of the antenna-to-antenna distance d2 from the short-range wireless communication unit 1057 or another apparatus. The short-range wireless communication unit 1010 can specify the direction of the short-range wireless communication unit 1010 as viewed from the short-range wireless communication unit 1057 by calculating the AoD 802 as with Equation (4). In addition, the short-range wireless communication unit 1010, by knowing how the antenna 604 and the antenna 605 are arranged, based on AoD 802, can estimate the direction in which the radio waves arrived. That is, if the antenna 604 is arranged on the west side of the antenna 605 and AoD 802 is estimated to be 45°, the short-range wireless communication unit 1010 can estimate that radio waves have arrived from a southeast direction. Furthermore, the short-range wireless communication unit 1010, from the reception strength of the radio wave and the transmission power of the radio wave, can estimate the distance between the short-range wireless communication unit 1057, and thereby can recognize the positional relationship between the short-range wireless communication unit 1057. Further, the short-range wireless communication unit 1010, by obtaining the information of the position where the short-range wireless communication unit 1057 is arranged, can estimate its position with high accuracy.

In the description of a method in which the short-range wireless communication unit 1010 is realized by comprising a plurality of antennas, description is given for a form in which two antennas—the antenna 601 and the antenna 602—are used as a plurality of antennas, but the number of antennas used is not limited to this. For example, the information processing apparatus 1001 may obtain the angle of arrival θ 702 by using three or more antennas and calculating an average of the angle of arrival θ obtained from each antenna. Similarly in the method realized by short-range wireless communication unit 1057 being provided with a plurality of antennas, the number of antennas used as a plurality of antennas is not limited to that given above. For example, the communication apparatus 1051 may obtain the angle of departure φ 802 by using three or more antennas and calculating an average of the angle of departure φ obtained from each antenna.

Description was given above regarding an embodiment in which one of the information processing apparatus 1001 and the communication apparatus 1051 uses a plurality of antennas, but there is no limitation to this. Both apparatuses may use a plurality of antennas.

Description is made above regarding a form in which the information processing apparatus 1001 detects the direction of one communication apparatus 1051, but there is no limitation to this. The information processing apparatus 1001 may detect the direction of two or more communication apparatuses 1051. Also, the information processing apparatus 1001, by detecting two or more directions of the communication apparatus 1051 and referring to each piece of detection data, compared to a form in which one direction of the communication apparatus 1051 is detected, can detect a position and a distance a direction between the apparatuses with higher accuracy.

Here, a method of estimating the position of the information processing apparatus 1001 with reference to the communication apparatus 1051 using AoD will be briefly described. It is assumed that the communication apparatus 1051 is fixed and the information processing apparatus 1001 moves. The AoD shown in FIG. 4 is not an angle that can be captured planarly. In a cone that has a straight line connecting the antennas 604 and 605 as an axis, has the antenna 605 as a vertex, and has a line segment of length l extending in the AoD (=φ) direction as a generatrix, the AoD indicates the angle formed by the axis and the generatrix at that vertex. The length l is a distance from the information processing apparatus 1001 to the communication apparatus 1051. The circle that is the bottom surface of the cone indicates the position of the information processing apparatus 1001. Here, the distance l can be specified, for example, by a conventional Bluetooth technique. For example, a value of reference power that is transmitted by the communication apparatus 1051 (power at a predetermined distance from the transmission source) can be received by the information processing apparatus 1001, and the distance l can be estimated based on the received power and the reference power value at that time. The transmitting side and the receiving side may be reversed. Thus, the position of the information processing apparatus 1001 with respect to the communication apparatus 1051 can be specified as being anywhere on the circumference of the bottom surface of the cone described above, in other words on a circumference in a plane orthogonal to a line joining the two antennas of the communication apparatus 1051 that is taken as an axis (center). As a result, a coordinate component in the axis direction (i.e., the height of the cone described above) can be determined as l*cos φ. Therefore, when two orthogonal axes (X-axis, Y-axis) are provided (in other words, an antenna array is provided so as to respectively configure the X-axis and the Y-axis) and the AoDs with respect to the X-axis and the Y-axis are respectively φ1 and φ2, the coordinate component of each axis is x=l*cos φ1 and y=l*cos φ2. This is sufficient to obtain the orthogonal coordinates on the plane. In a case of specifying a height component, for a Z-axis orthogonal to the X-axis and Y-axis, a respective AoD (let its value be φ3) is measured by providing at least two antennas a predetermined distance apart. Thereby z=l*cos φ3 can be obtained and a position in the XYZ space can be determined as (l*cos φ1, l*cos φ2, l*cos φ3). Of course, this description is exemplary and other methods of determining a position may be used. Since the AoD is an amount specified by the information processing apparatus 1001, the information processing apparatus 1001 may measure the AoD for each axis, determine the position, and then transmit the AoD to the communication apparatus 1051, or may transmit the AoD to the communication apparatus 1051, and the communication apparatus 1051 may specify the position.

Also, regarding AoA is similar to the description given above, and the position of a device which is a transmission source of a signal can be specified from the AoA. However, because a position that can be determined using AoA is the position of the communication apparatus 1051 with reference to the information processing apparatus 1001, coordinate transformation may be performed so as to move the position of the origin to the communication apparatus 1051 as necessary. In this manner, it is possible to specify the position of the information processing apparatus 1001 over an entire circumference centered on the communication apparatus 1051.

Configuration of Printing Apparatus

Figure 5:
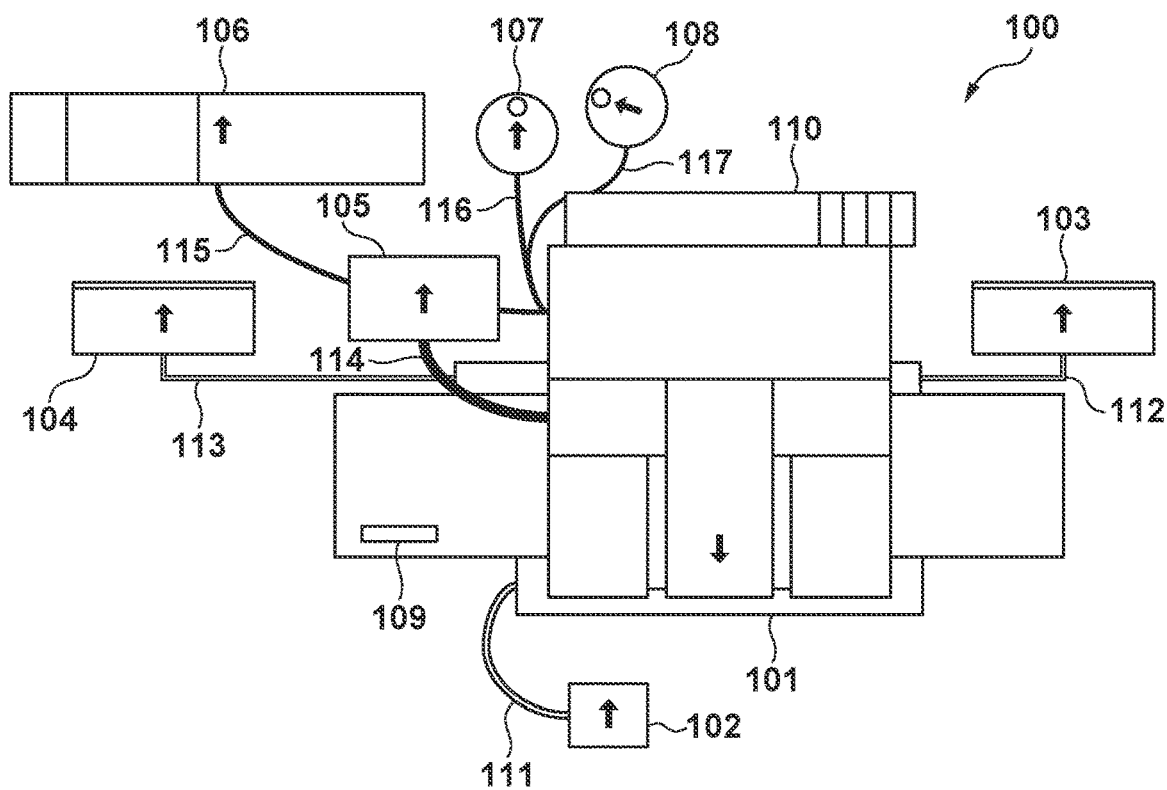
FIG. 5 is a top view of each unit of a printing apparatus.
Figure 6:
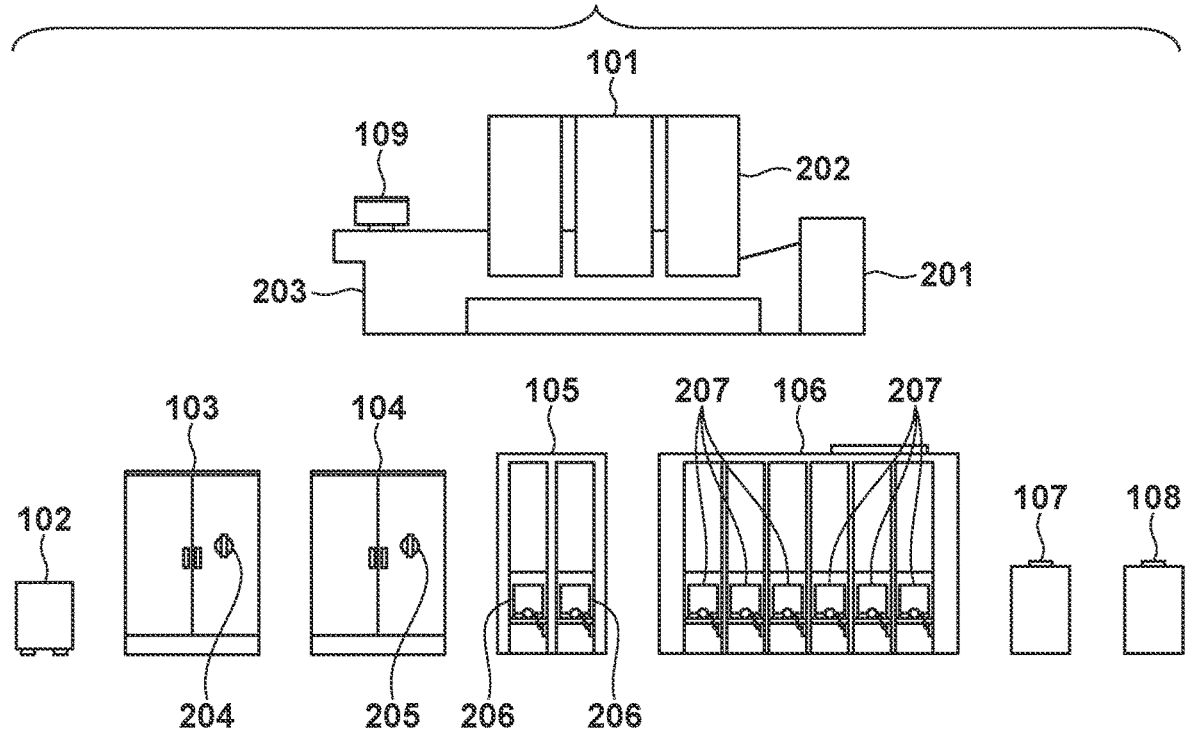
FIG. 6 is a front surface view of each unit of the printing apparatus.

Next, an overall configuration of a printing apparatus that includes the communication apparatus 1051 according to the present embodiment will be described with reference to FIGS. 5 and 6. FIG. 5 shows a top view of each unit of a printing apparatus. FIG. 6 is a front surface view of each unit of the printing apparatus shown in FIG. 5. Incidentally, the direction of the front of each unit is shown in FIG. 5 by an arrow symbol. It is assumed that the printing apparatus of the present embodiment is fixedly installed.

In FIGS. 5 and 6, the main unit 101 is a main unit that performs a printing operation in the printing apparatus. The main unit 101 includes a sheet feeding unit (sheet feeding unit) 201 that performs a sheet feeding operation for a printing sheet, a printing unit 202 that performs ink discharge from an inkjet head (not shown) to form an image on the sheet, and a sheet discharge unit (sheet discharge unit) 203 that discharges the sheet. In addition, it includes a touch panel display 109 that serves as a user interface for the apparatus, and also includes an electronic substrate (not shown) therein for controlling each section. A DFE (Digital Front End) 102 is a server computer for print jobs and image data that manages print jobs performed by the printing apparatus. The DFE 102 can be connected to an external network by a network cable (not shown) and print jobs can be inputted over the network. Further, the DFE 102 is connected to the main unit 101 by a DFE cable 111. The DFE cable 111 is a communication line for transmitting and receiving image data and commands. In the following description, a printing apparatus is sometimes referred to as the printing apparatus 101, but in this case, it is assumed that the printing apparatus 101 includes not only the main unit but also all of the components of the printing apparatus.

The first power supply unit 103 is one of two power supply units for supplying power to the printing apparatus, and is provided with a first power supply unit breaker switch 204 as shown in FIG. 6. Further, the first power supply unit 103 is connected to the main unit 101 by a first power supply unit cable 112. The first power supply unit cable 112 is a cable that bundles an electrical cable for supplying a large current, and a communication line for performing communication between units. The second power supply unit 104 is one of two power supply units for supplying power to the printing apparatus, and is provided with a second power supply unit breaker switch 205 as shown in FIG. 6. Further, the second power supply unit 104 is connected to the main unit 101 by a second power supply unit cable 113. The second power supply unit cable 113 is a cable that bundles an electrical cable for supplying a large current, and a communication line for performing communication between units. A consumable liquid unit 105 is a unit for installing a consumable liquid tank 206 used in an image forming process of the printing apparatus. Examples of the consumable liquid include a cleaning liquid used for cleaning an inkjet head, and a coating agent for improving image quality. Further, the consumable liquid unit 105 is connected to the main unit 101 by a consumable liquid unit cable 114. The consumable liquid unit cable 114 is a cable that bundles a supply tube for supplying consumable liquid to the printing unit 202 and a communication line for performing communication between units. The consumable liquid unit 105 further includes a mechanism for suctioning respective consumable liquid from a respectively installed consumable liquid tank 206, and can supply the consumable liquid to the main unit 101 through the supply tube of the consumable liquid unit cable 114.

An ink tank unit 106 is a unit for installing a respective ink tank 207 holding a respective color of ink which is to be discharged from an inkjet head. Further, the ink tank unit 106 is connected to the main unit 101 by an ink tank unit cable 115. The ink tank unit cable 115 is a cable that bundles supply tubes for supplying ink of each color to the printing unit 202 and a communication line for performing communication between units. The ink tank unit 106 further has a mechanism for suctioning respective ink from the ink tank 207 of respective colors installed, and can provide a consumable to the main unit 101 through the ink tank unit cable 115. The first waste liquid tank 107 is a tank for temporarily storing used or surplus consumable liquid or the like. The first waste liquid tank 107 is connected to the main unit 101 by a first waste liquid tank cable 116. A first waste liquid tank cable 116 is a cable that bundles a discharge tube for passing waste liquid discharged from the main unit 101 and a communication line for performing communication between respective units. The second waste liquid tank 108 is a tank for temporarily storing surplus ink or the like. The second waste liquid tank 108 is connected to the main unit 101 by a second waste liquid tank cable 117. The second waste liquid tank cable 117 is a cable that bundles a discharge tube for passing waste liquid discharged from the main unit 101 and a communication line for performing communication between respective units.

The rear surface of the main unit 101 is provided with a step 110. The above is the overall configuration of the apparatus. As the external configuration of the printing apparatus, there is for example an external power supply cable connected to the first power supply unit 103 and the second power supply unit 104 and a duct or the like for releasing exhaust generated by a printing operation, but description thereof is omitted.

Next, typical work performed by the operator on each unit of the printing apparatus will be described. For the main unit 101, a sheet is installed in the sheet feeding unit 201, and printed material is carried out from the sheet discharge unit 203. In addition, by operating the touch panel display 109, operations for performing functions such as confirming various apparatus states and printing and automatic maintenance are possible. For the DFE 102, an operation such as inputting a print job is performed. For the first power supply unit 103 and the second power supply unit 104, operation of the breaker switches 204 and 205 before operation of the apparatus is performed. Replacement of a consumable liquid tank is performed for the consumable liquid unit 105. For the ink tank unit 106, the ink tank 207 of each color is replaced. For the first waste liquid tank 107 and the second waste liquid tank 108, work to discharge the waste liquid in the tanks and move it to a drum for waste is performed.

Position Detection Method

Figure 7:
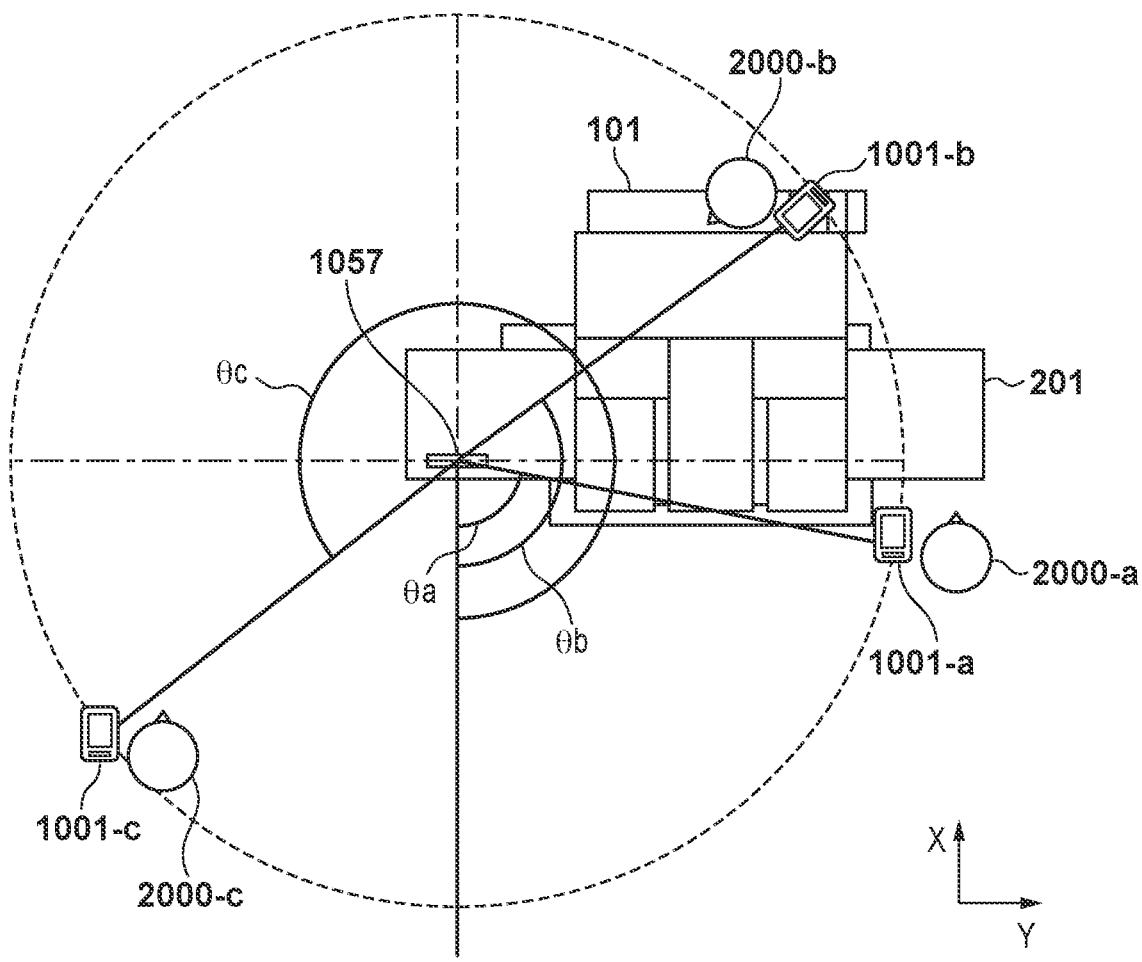
FIG. 7 shows an example of obtaining a positional relationship between an information processing apparatus and a unit in accordance with direction detection in BLE.

Next, a method of detecting the positional relationship between an operator and the printing apparatus will be described with reference to FIG. 7. The printing apparatus can communicate with a terminal which is the information processing apparatus 1001 by short-range wireless communication. This is referred to as a printing system that includes an information processing apparatus and a terminal apparatus capable of communicating. The positional relationship that is specified by the method described may be the position of the information processing apparatus or terminal apparatus with respect to the position of a predetermined portion, such as a particular antenna of the printing apparatus. FIG. 7 is a top view of a printing apparatus (X-Y plane). An operator 2000 carries an information processing apparatus 1001 and performs an operation of the printing apparatus 101. Therefore, the position of the operator is considered to be equal to the position of the information processing apparatus 1001. There may be a plurality of operators for each printing apparatus. Each operator carries one information processing apparatus. In the example of FIG. 7, operators 2000-a, 2000-b, and 2000-c have information processing apparatuses 1001-a, 1001-b, and 1001-c, respectively. The printing apparatus stores in advance the distance to and the angle with respect to each unit described in FIGS. 5 and 6, with the short-range wireless communication unit 1057 as the origin. The angle is assumed to be based on a predetermined axis passing through the origin. For the distance and angle, it is sufficient if they are the distance and angle on the plane as viewed from the top surface. The short-range wireless communication unit 1010 held by the information processing apparatus 1001 and the short-range wireless communication unit 1057 held by the printing apparatus perform the above-described communication by BLE, and the distance and angle with respect to the information processing apparatus 1001 are detected using the short-range wireless communication unit 1057 as the origin. A unit having a distance and angle closest to the measured distance and angle with respect to the information processing apparatus 1001 becomes the unit closest to the information processing apparatus 1001 and the operator 2000. All of the information processing apparatuses 1001-a, 1001-b, and 1001-c of FIG. 7 have the same distance from the origin to the information processing apparatus 1001, but since the angles θa, θb, and θc are different, the closest unit for each can be detected correctly. That is, the unit with a close angle can be specified as the closest unit. For example, it can be said that the information processing apparatus 1001-a is near the sheet feeding unit 201 and the operator 2000-a is positioned near the sheet feeding unit 201. Note that both the nearest distance and the nearest angle are not necessarily satisfied. Therefore, the position in polar coordinates specified by the measured distance and the angle may be converted into orthogonal coordinates with the short-range wireless communication unit 1057 as the origin, and the unit with the shortest distance from the information processing apparatus 1001 may be determined to be the closest unit from the information processing apparatus 1001. To do so, the position of each unit may be held as orthogonal coordinates instead of or in addition to polar coordinates.

Specification of the position as shown in FIG. 7 can be performed from an AoA or an AoD. An example of this method is as described above. For example, it is possible to measure the AoD from the short-range wireless communication unit 1051 of the printing apparatus and specify a position based on the AoD. Therefore, for example, consider the center of the circle shown by the dotted line in FIG. 7 to be an origin in the X-direction axis (referred to as the X-axis) and consider the Y-axis to be orthogonal to the X-axis. For example, one antenna may be provided at the origin, one at a position which is a distance d along the X-axis from the origin, and one at a position which is a distance d along the Y-axis from the origin. When employing polar coordinates, a reference for an angle (referred to as a reference line) is the X-axis extending downward in the figure from the origin. The group of antennas provided along the X-axis is referred to as X-axis antennas, and the group of antennas provided along the Y-axis is referred to as Y-axis antennas. By specifying the AoD and distance for the X-axis antennas and the Y-axis antennas respectively, it is possible to specify the position of the information processing apparatus 1001 in the X-Y plane.

Figure 8:
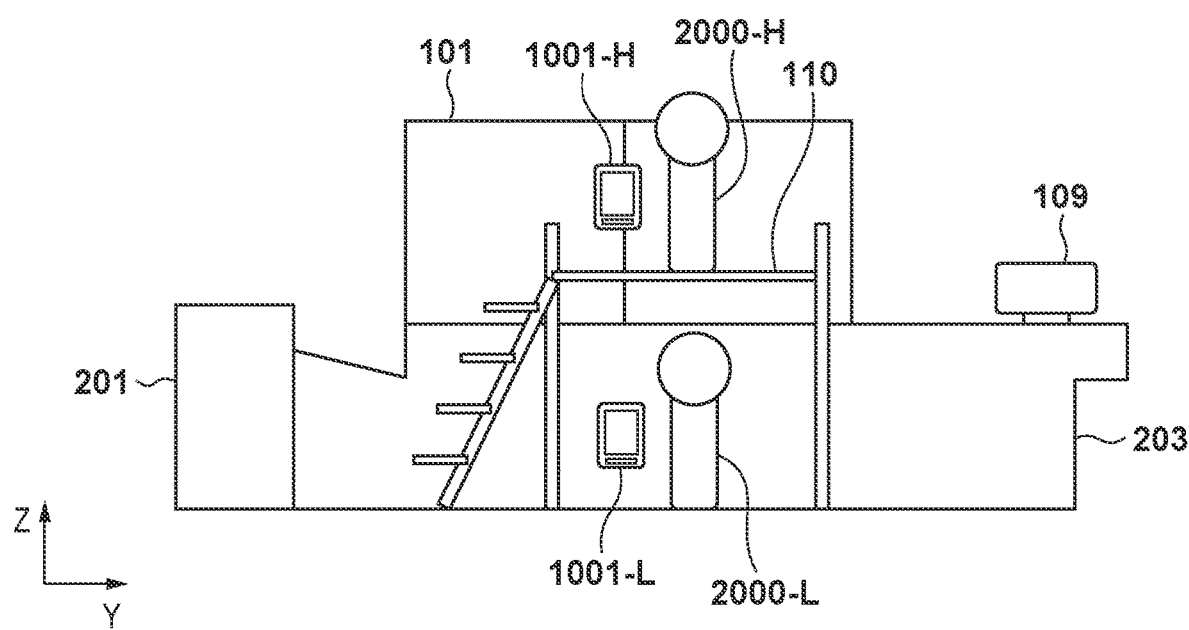
FIG. 8 shows an example of obtaining a positional relationship between an information processing apparatus and a unit in accordance with direction detection for a height direction in BLE.
Figure 9:
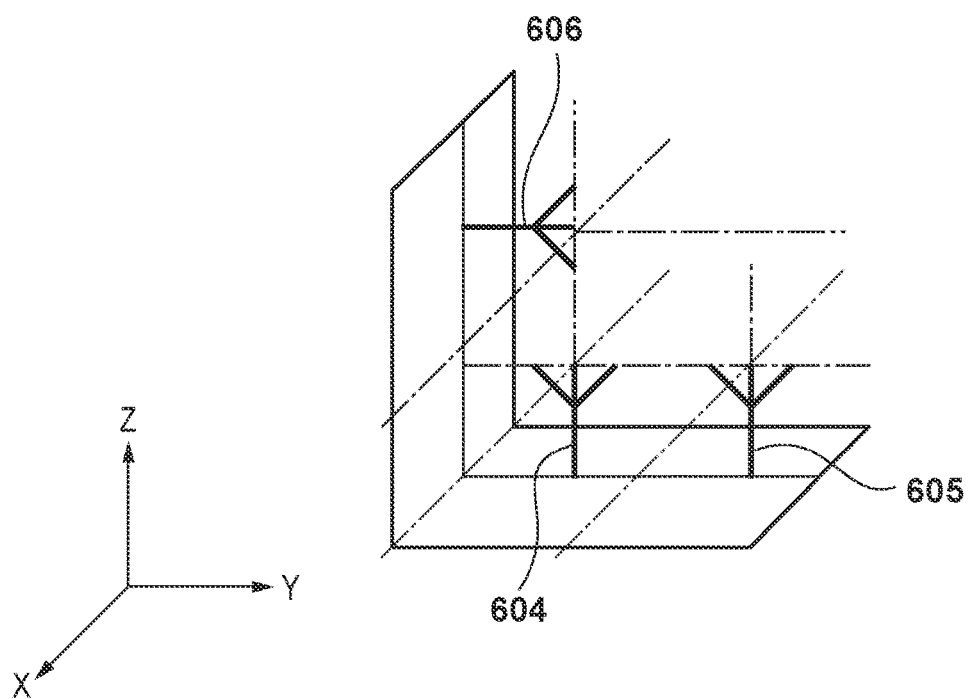
FIG. 9 shows a configuration in which a plurality of antennas are provided on an advertisement transmitting side when direction detection for three axial directions is performed in BLE.

Next, a method of detecting the positional relationship in a height direction (Z direction) between an operator and the printing apparatus will be described with reference to FIG. 8. FIG. 8 is a rear view of a printing apparatus (Y-Z plane). Operators 2000-L and 2000-H have information processing apparatuses 1001-L and 1001-H, respectively. The distance of the information processing apparatus 1001-L and 1001-H to the short-range wireless communication unit 1057 on the X-Y plane is equal, but there is a difference in a height direction Z. The difference in the height direction Z for a large printing apparatus is important in a case of detecting the positional relationship between an operator and the printing apparatus, because there are differences in units for which work can be performed. With reference to FIG. 9, description is given for a method in which the short-range wireless communication unit 1057 detects the three axial directions of the communication apparatus 1051. In FIG. 9, three antennas 604, 605, and 606 are provided as a plurality of antennas. Regarding an X-axis antenna provided along the X-axis in FIG. 9 is omitted. An X-axis antenna (not shown) is provided at a position which is a distance d from the antenna 604 on a line that is parallel to the X-axis and that goes through the antenna 604 of FIG. 9, for example. The distance d may be the same as the distance between the antenna 604 and the antenna 605. The antennas 604 and 605 which are receiving units are arranged with a predetermined distance therebetween on the X-Y plane, and the antennas 604 and 606 are arranged with a predetermined distance therebetween on the X-Z plane. Therefore, the distance and angle between the short-range wireless communication unit 1057 and the information processing apparatus 1001, and the distance and the angle on the X-Y plane can be obtained in accordance with the aforementioned AoD (Angle of Departure) measurement method by using the antennas 604 and 605. Similarly, the distance and angle on the X-Z plane can be obtained by using the antennas 604 and 606. Although omitted in FIG. 9, an antenna is also provided at a position of a predetermined distance from the antenna 604 along the X-axis, and a position on the X-Y plane is specified in accordance with the antenna group provided in the X-Y plane. An overview of specifying the position in the Z direction may be similar that in the case of specifying the position in the X-Y plane. This is as described with reference to FIG. 4. In this manner, it is possible to determine the position of the information processing apparatus 1001 in a three-dimensional space. Of course, the above-described method is merely an example, and the position can be specified by another method.

Here, an example of a problem related to the embodiment described below will be described. Usually, operation and maintenance of a large-sized apparatus requires an operator to perform a wide variety of operations. For example, an operator needs perform operations to set a printing sheet in a sheet feeding unit to prepare for printing and take out an already printed sheet from a sheet discharge unit, but in a large-sized apparatus, the sheet feeding unit and the sheet discharge unit may be separated by several meters. In such an apparatus, there is a problem that a movement time by an operator between modules becomes downtime of the apparatus in operation of modules at a plurality of locations. In addition, so that the operator does not inadvertently come into contact with an operation of the apparatus, before this operation, it is necessary to warn the operator of a withdrawal operation and confirm the withdrawal. In a large-sized apparatus, a plurality of operators may be performing operations, and if an operator away from an operating module also confirms the withdrawal, there is a possibility that an unnecessary confirmation time may result in downtime.

First Embodiment

Figure 10:
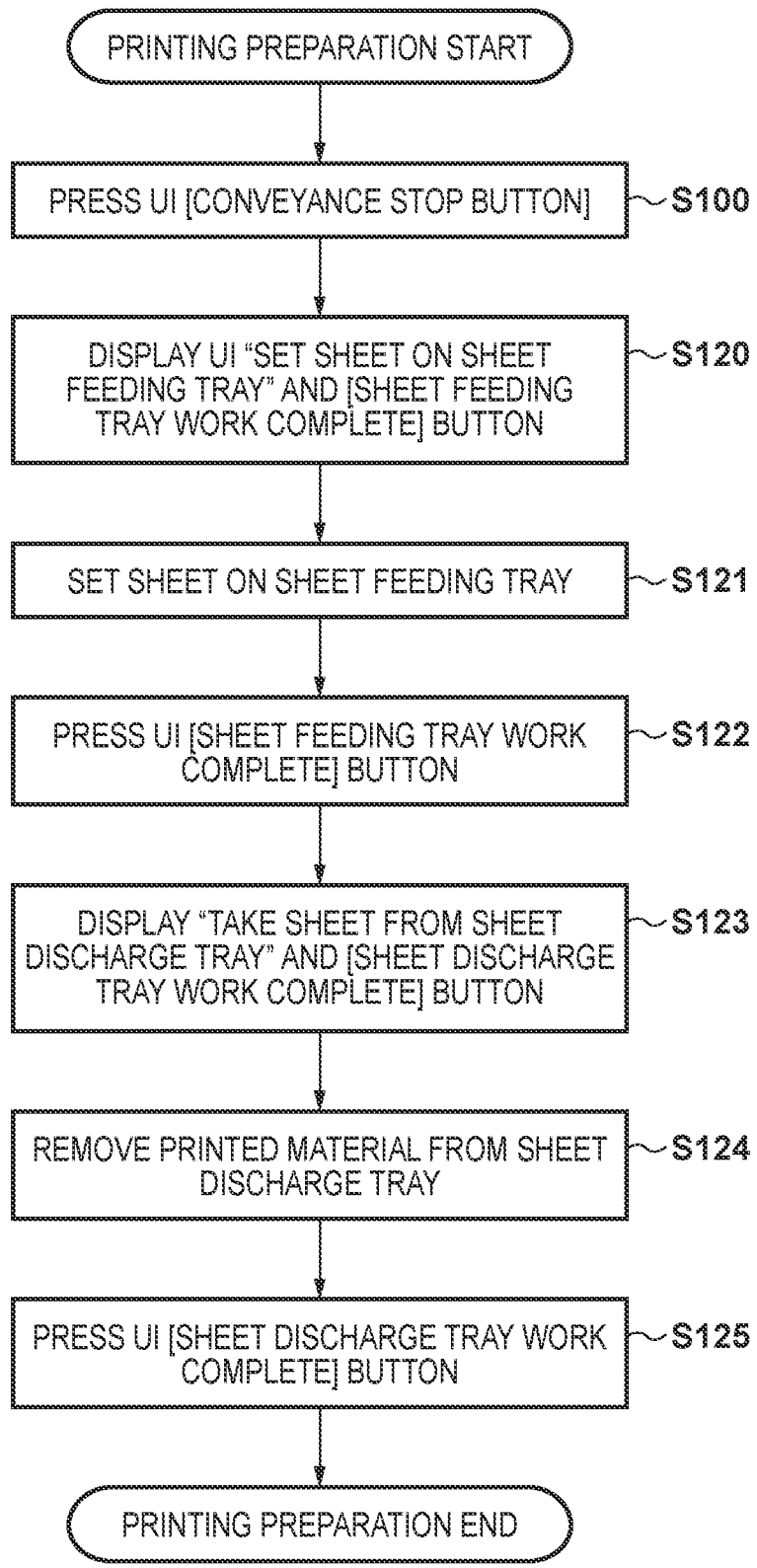
FIG. 10 is a flowchart showing a conventional pre-print process.
Figure 11:
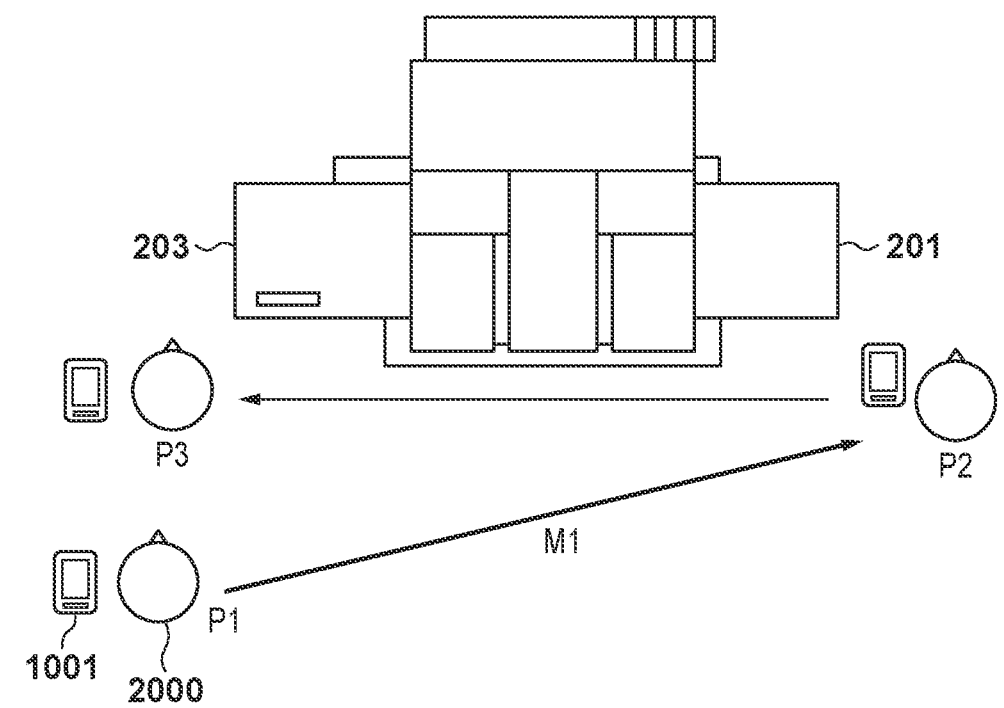
FIG. 11 shows operator flow lines of a conventional pre-print process.

In the above-described apparatus configuration, a means for reducing the movement time by an operator between modules by optimizing an operation order of modules of a plurality of locations will be described by taking operations of printing preparation as an example. First, description for operations of printing preparation is given by taking as an example a case where the order of operations is not optimized. FIG. 10 is a flowchart thereof, and FIG. 11 is a top view showing a flow line of an operator, and a case where the operation is started from a position P1 of the operator will be described. The information processing apparatus 1001 executes, for example, a printing application. In printing preparation operations, firstly, in step S100, the operator 2000 presses a "conveyance stop button" of a UI displayed on the display unit 1008 of the information processing apparatus 1001 which they are carrying. The information processing apparatus 1001 uses the communication unit 1009 to transmit an instruction indicating that the "conveyance stop button" is pressed to the printing apparatus having a short-range wireless communication unit 1057. Hereinafter, communication operations between the information processing apparatus 1001 and the printing apparatus are omitted. In response to the reception of the instruction, the conveyance unit of the main unit 101 of the printing apparatus stops its operation. Next, following the cessation of conveyance, in step S120, a message "set sheet on sheet feeding tray" and a [sheet feeding tray work complete] button are displayed on the display unit 1008. Seeing this display, the operator 2000 moves from the current position P1 to a position P2 in the vicinity of the sheet feeding unit 201, and sets a sheet on the sheet feeding tray in step S121. Then, the [sheet feeding tray work complete] button of the UI is pressed in step S122. Next, in step S123, a message "take sheet from sheet discharge tray" and a [sheet discharge tray work complete] button are displayed on the display unit 1008. The operator 2000 moves from the P2 near the sheet feeding unit 201 to the position P3 near the sheet discharge unit 203, and removes the printed material from the sheet discharge tray in step S124. Then, the [sheet discharge tray work complete] button of the UI is pressed in step S125. The above are the operations of printing preparation. Here, either the operations for the sheet feeding tray up to step S120 to step S122 or the operations for the sheet discharge tray of step S123 to step S125 may be performed first for the printing apparatus. If other preparations are completed, printing can be started at this stage.

Efficient Print Preparation Procedure

Figure 12:
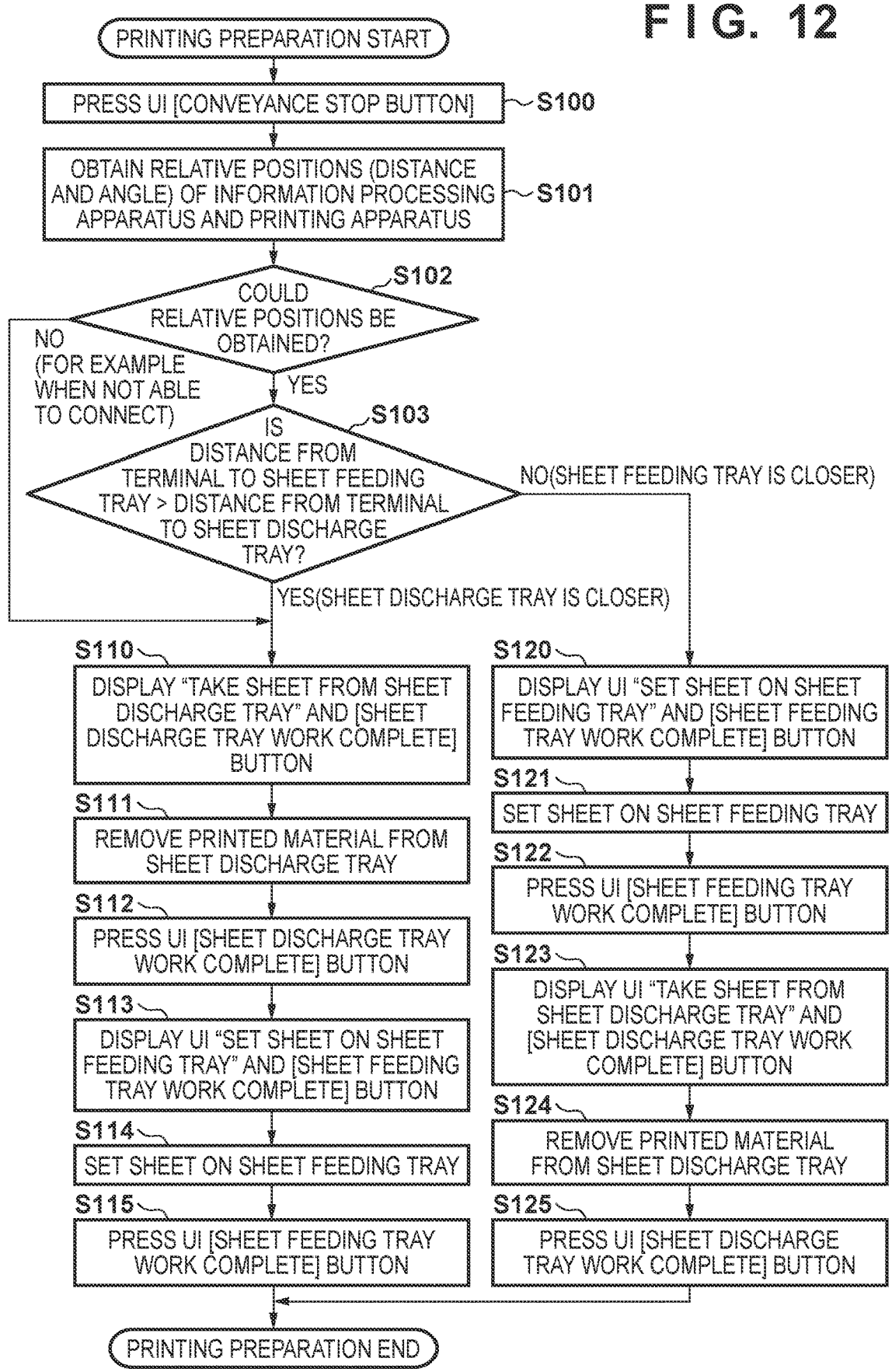
FIG. 12 is a flowchart showing the pre-print process according to the embodiment of the present invention.
Figure 13A:
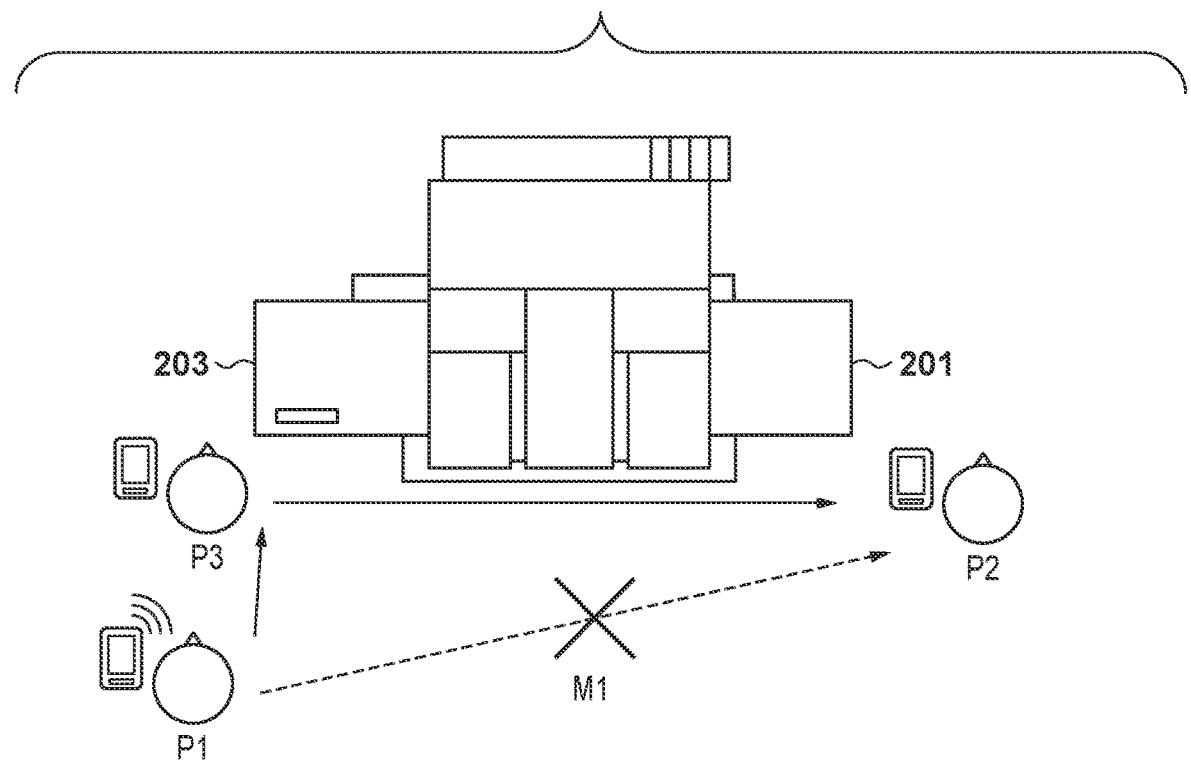
FIGS. 13A and 13B show operator flow lines of a pre-print process according to an embodiment of the present invention.
Figure 13B:
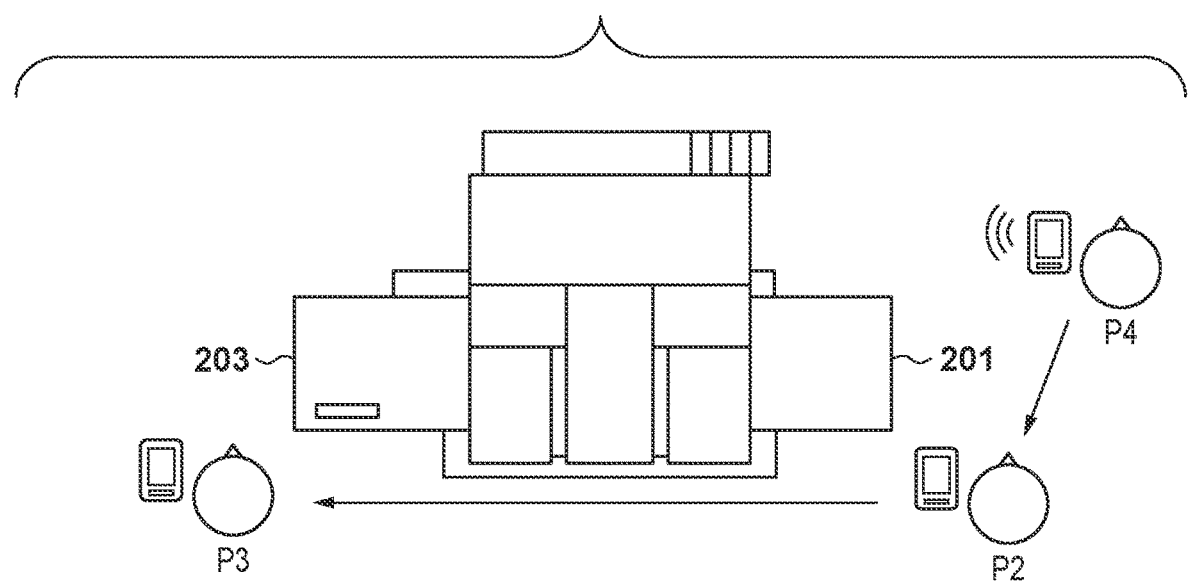

Next, a case of optimizing the operation order (or optimizing the work allocation) in the present embodiment will be described. That is, in this embodiment, the terminal apparatus and the unit are associated with each other so that a distance that the terminal apparatus moves with respect to a plurality of units is shortened on the basis of an association between the terminal apparatus and a unit such as the sheet feeding unit and the sheet discharge unit which is to be operated. A message is outputted based on this association. FIG. 12 is a flowchart in accordance with the information processing apparatus 1001 and the printing apparatus, and the information processing apparatus 1001 executes, for example, a printing application. The procedure of FIG. 12 is, in accordance with these steps, executed by the CPU 1003 of the information processing apparatus 1001 or the CPU 1054 of the short-range wireless communication apparatus 1051. FIGS. 13A and 13B are top views showing flow lines of an operator. Description is given for a case of starting from the position P1 of the operator shown in FIG. 13A (same condition as that of FIG. 11). In the drawing, the information processing apparatus is referred to as a terminal. It is assumed that, prior to the procedure of FIG. 12, information on the relative position of each unit of the printing apparatus is transmitted from the printing apparatus to the information processing apparatus 1001, and the information processing apparatus 1001 holds the information.

First, in step S100, the information processing apparatus 1001 accepts the pressing of the "conveyance stop button" of the UI by the operator 2000. Next, the relative positions (for example, distances and angles or orthogonal coordinates) of the information processing apparatus 1001 and the printing apparatus are then obtained (or determined) using BLE (for example, by receiving an advertising message) as described above in step S101. When the position of each unit is represented by a position with respect to the printing apparatus, it is preferable that the relative position between the information processing apparatus 1001 and the printing apparatus is also with respect to the printing apparatus. Note that the method of obtaining the relative position is as described in FIG. 3, FIG. 4, FIG. 7, FIG. 8 and the like.

The information processing apparatus 1001 confirms whether the relative position can be obtained in step S102. Once this is able to be confirmed, "distance from information processing apparatus 1001 to sheet feeding unit 201" and "distance from information processing apparatus 1001 to sheet discharge unit 203" are each calculated and compared in step S103 using the relative position of the obtained information processing apparatus 1001 and the position of each unit which is held in advance. When the "distance from information processing apparatus 1001 to sheet discharge unit 203" is smaller, since the sheet discharge unit 203 is closer to the current position of the operator 2000, for example, an instruction for an operation with respect to the sheet discharge unit 203 is displayed in step S110.

In response to the message, the operator 2000 moves to the position P3 near the sheet discharge unit, removes printed material from the sheet discharge tray in step S111, and presses a [sheet discharge tray work complete] button of the UI. In step S112, the information processing apparatus 1001 accepts the press of the button. Next, an operation with respect to the remaining sheet feeding unit 201 is instructed in step S113 in response to the press of the [sheet discharge tray work complete] button. The instruction is performed, for example, by displaying a message. The operator 2000 that received the instruction moves to the position P2 near the sheet feeding unit, sets a sheet in the sheet feeding tray in step S114, and ends their work by pushing the [sheet discharge tray work complete] button on the UI. In step S115, the information processing apparatus 1001 accepts the pressing of the [sheet discharge tray work complete] button. In a case where the flow line is not optimized or streamlined, the flow line of the operator shown in FIG. 11 is P1→P2→P3, but in the case where the flow line is optimized, it is P1→P3→P2 as in FIG. 13A, and the movement time of the operator between modules is reduced.

In the example of FIG. 13B, when starting from the position P4 of the operator, the distance from the information processing apparatus 1001 to the sheet feeding unit 201 is smaller in step S103. Since the sheet feeding unit 201 is closer to the current position of the operator 2000, an operation with respect to the sheet feeding tray is instructed first in step S120 to step S122, and an operation with respect to the sheet discharge tray is instructed next in step S123 to step S125. In other words, B swaps the order of step S110 to step S112 and step S113 to S115 of A. This makes it possible to improve the efficiency of the flow line.

As described above, whatever position an operator starts an operation from, it is possible to optimize an operation order that reduces movement time. Although all of FIG. 12 is described as being executed by the information processing apparatus 1001, the printing apparatus (or the communication apparatus 1051) may execute FIG. 12 except for displaying a user interface and making inputs. In this case, the printing apparatus instructs the information processing apparatus 1001 to display a user interface, and the information processing apparatus 1001 notifies the printing apparatus of the acceptance of the operation.

Second Embodiment

Figure 14:
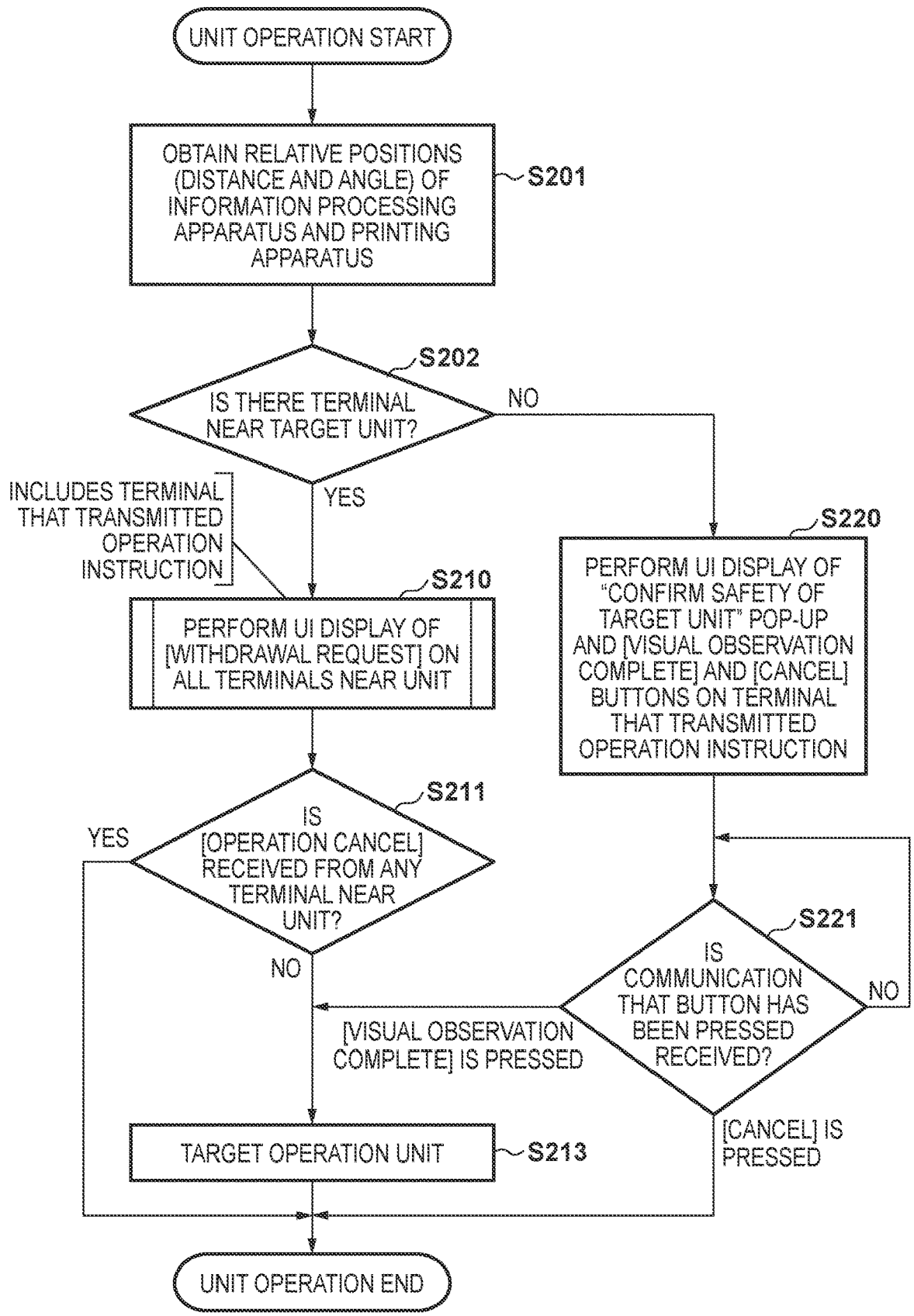
FIG. 14 is a flowchart illustrating unit operation.

In the same apparatus configuration as that of the first embodiment, description is given by taking as an example an operation for starting operation of a unit in relation to a means for issuing a warning to an operator near a unit that operates. That is, a warning is output based on the association between the operating unit and a terminal apparatus in the vicinity. FIGS. 14 and 15 are flowcharts. Both of FIG. 14 and FIG. 15 are executed by the information processing apparatus 1001 or the printing apparatus 1051, in particular, the CPUs thereof.

First, an example of a warning operation to the operator who issued a work instruction will be described using FIG. 14 and FIG. 16. In this example, the unit to be operated is a sheet feeding tray. An operator 1001-A uses an information processing apparatus 1001-A to instruct the start of unit operation of the sheet feeding tray. The processing of FIG. 14 is executed after the instruction. The information processing apparatus 1001 which is in the vicinity of a printing apparatus specifies the relative positions (distances and angles) of the information processing apparatus 1001 and the printing apparatus in step S200 using BLE as described above. The specified relative positions are transmitted to the printing apparatus together with an instruction to start the unit operation of the sheet feeding tray. Note that the printing apparatus obtains the relative position of the information processing apparatuses with respect to all the information processing apparatuses in the vicinity of the printing apparatus. Therefore, for example, a printing apparatus that has received an instruction to start unit operation may instruct a peripheral information processing apparatus to determine and transmit a relative position, or the information processing apparatus 1001 may periodically determine and transmit its relative position to the printing apparatus. In the latter case, since step S200 is performed asynchronously and periodically with respect to the procedure of FIG. 14, step S200 does not need to be performed during FIG. 14. Note that an information processing apparatus in the vicinity of the printing apparatus may be, for example, the information processing apparatus 1001 which is in a range in which it can communicate with the communication apparatus 1051. Thereafter, the information processing apparatus 1001 which is within the range where it can communicate with the communication apparatus 1051 is an information processing apparatus 1001 which is in the vicinity of the printing apparatus.

The printing apparatus that has collected the relative position from the information processing apparatus 1001 which is in the vicinity determines whether the information processing apparatus 1001 is located near a unit of a sheet feeding tray that is an operation target in step S201. When this is determined, the printing apparatus transmits a [withdrawal request] message to all the information processing apparatuses 1001 which are determined to be near the unit of the sheet feeding tray (only the information processing apparatus 1001-A in FIG. 16).

The information processing apparatus 1001 that received the withdrawal request message (here, the information processing apparatus 1001-A) executes step S210. The detail of step S210 is shown in FIG. 15. In step S300, the information processing apparatus 1001 performs a pop-up display of an "instruction to withdraw from target unit" screen. In this screen, [withdrawal complete] and [cancel] buttons are displayed together with the message prompting the withdrawal (see 16A of FIG. 16). When the operator 1001-A withdraws from the sheet feeding tray and presses [withdrawal complete] in step S301, the information processing apparatus 1001 that has accepted this press transmits [withdrawal complete] to the printing apparatus in step S330 (see 16B of FIG. 16). In a case where [cancel] is pressed such as when the operator cannot withdraw, the information processing apparatus 1001 that has accepted this transmits [operation cancel] to the printing apparatus in step S330.

Note that, in step S301, detecting, using position information, that the operator 1001-A has withdrawn from the sheet feeding tray by a sufficient distance may be used instead of a press of the [withdrawal complete] button. A flow for this purpose will be described. That the information processing apparatus 1001-A obtains the relative position information in step S310 and obtains the relative position information in step S311 is confirmed. When these are able to be obtained, in step S312 it is determined that the information processing apparatus 1001-A is at a predetermined distance or more from the vicinity of the unit to withdraw from, that is, the sheet feeding tray. In this instance, the information processing apparatus 1001-A may hold the position of the unit to withdraw from, and may determine step S312 based on the position. When it is determined that the information processing apparatus 1001-A is at a predetermined distance or more from the vicinity of the unit to withdraw from, that is, the sheet feeding tray (see 16C of FIG. 16), [withdrawal complete] is transmitted to the printing apparatus in step S330. Note that, in step S311, the relative position of the information processing apparatus 1001-A may be transmitted to the printing apparatus, and the printing apparatus may execute step S312. Since the printing apparatus itself performs the determination of step S312, instead of transmitting withdrawal complete in step S330, it performs processing as if it received withdrawal complete from the relevant information processing apparatus.

In step S211, it is confirmed whether or not [operation cancel] has been received from any information processing apparatus 1001. If so, the operation instruction of the unit is cancelled and manual processing ends. In contrast, when withdrawal complete (including an information processing apparatus regarded as withdrawal complete) can be received from all the information processing apparatuses 1001 to which [withdrawal request] was transmitted in step S210, the operation of the unit is performed in step S213.

Further, when an information processing apparatus 1001 is not near the unit of the sheet feeding tray to be operated in step S201, there is no information processing apparatus 1001 to which a warning is issued. In order to ensure safety, in this case, the printing apparatus transmits a "confirm safety of target unit" message to the information processing apparatus 1001 that transmitted the operation instruction in step S220. The information processing apparatus 1001 that has received this displays a pop-up in response to the received message and displays [visual observation complete] and [cancel] buttons in a UI. In a case where it is confirmed that the operator has pressed the [visual observation complete] button after confirming safety in step S221, the operation of the unit is performed in step S213. When cancel is pressed, the operation of the unit is not performed.

With the above-described configuration and procedure, before operation of the printing apparatus, it is possible to specify an operator who may be at risk due to the operation. Only an operator who needs to withdraw is requested to withdraw, and confirmation of this is accepted. In this way, it is possible to omit an unnecessary withdrawal confirmation from an operator who does not need to withdraw, and it is possible to reduce downtime. In addition, the withdrawal confirmation can be transmitted from the position information of an operator without waiting for an operation by the operator.

[Variation]

Next, another example of the warning operation to an operator other than the operator who issued the work instruction will be described using FIG. 17, and differences from the case of FIG. 16 will be described. In the procedures of FIGS. 14 and 15, safety confirmation is prompted to the information processing apparatus 1001 that has issued the unit operation instruction only when there is no information processing apparatus 1001 that should withdraw. When there is another information processing terminal 1001 that should withdraw, no message is displayed on the information processing apparatus 1001 which issued the unit operation instruction.

Figure 17:
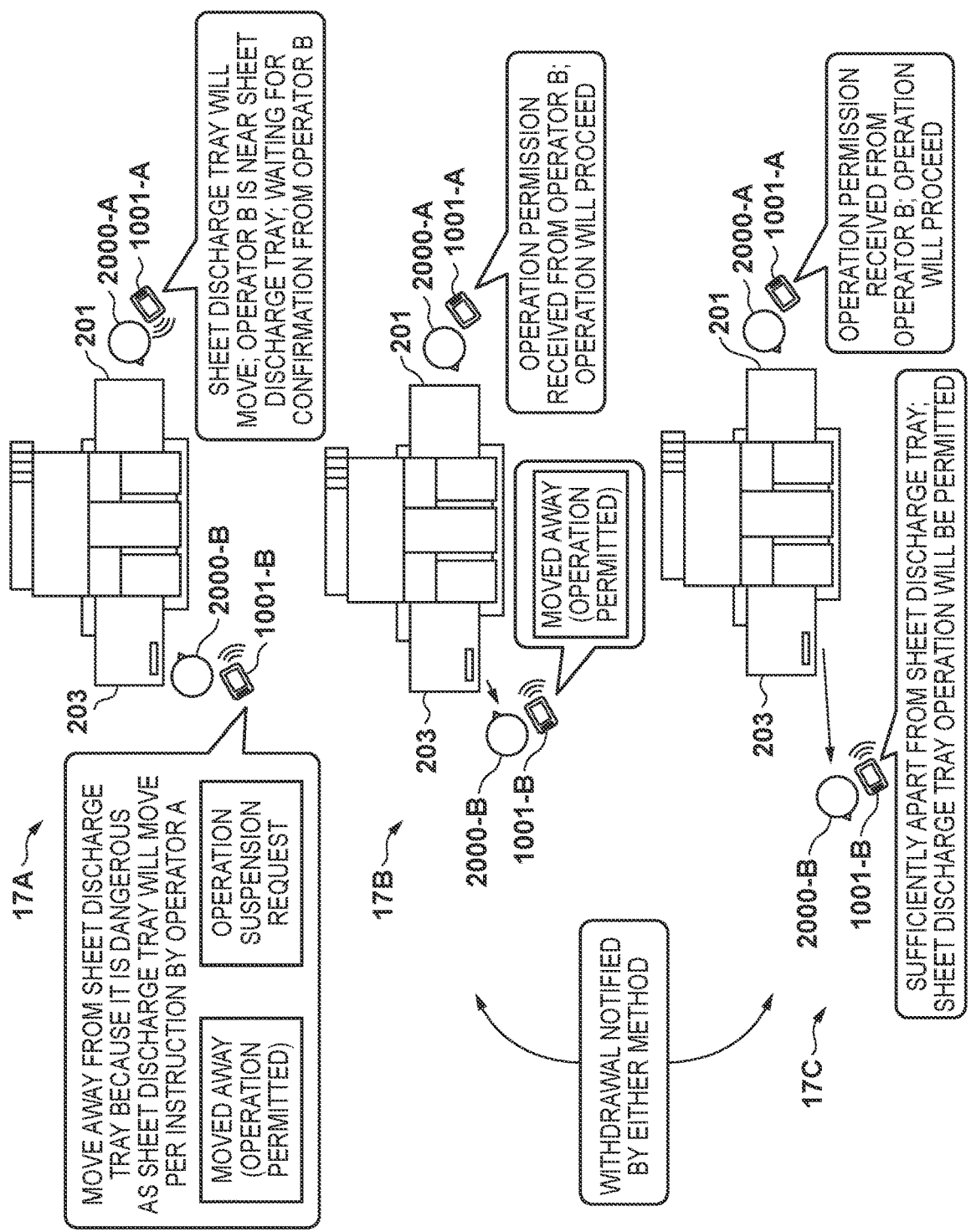
FIG. 17 shows examples of operation when an operator who has not issued a unit operation instruction is near an operation unit.

In contrast to this, in FIG. 17, when there is another information processing terminal 1001 that should withdraw, the information processing apparatus 1001 that issued the unit operation instruction displays a message indicating this. For this reason, [withdrawal request] is transmitted to the information processing apparatus 1001-B which is determined to be in the vicinity of the unit in step S210 of FIG. 14. At the same time, for the information processing apparatus 1001-A, which is the transmission source of the unit operation instruction and is determined not to be near the unit, a message or the like indicating waiting for [withdrawal complete] from all the information processing apparatuses which are the transmission destinations of the withdrawal request (the information processing apparatus 1001-B here), is displayed. Further, when the printing apparatus receives the withdrawal complete response (including when it is treated as withdrawal complete) from all the information processing apparatus that were transmission destinations of the withdrawal request, the printing apparatus transmits and causes the information processing apparatus 1001-A to display an operation forenotice message indicating that the operation is to be performed. The other points follow the procedures of FIGS. 14 and 15. With such a configuration, forenotice of an operation can be made to the information processing apparatus that is the operation instruction source and is at a position where it is unnecessary to withdraw. In the above example, the operation forenotice is displayed in the information processing apparatus of the operation instruction source of the unit, but the operation forenotice message may be transmitted to all the information processing apparatuses positioned where withdrawal is not necessary.

Third Embodiment

Figure 18:
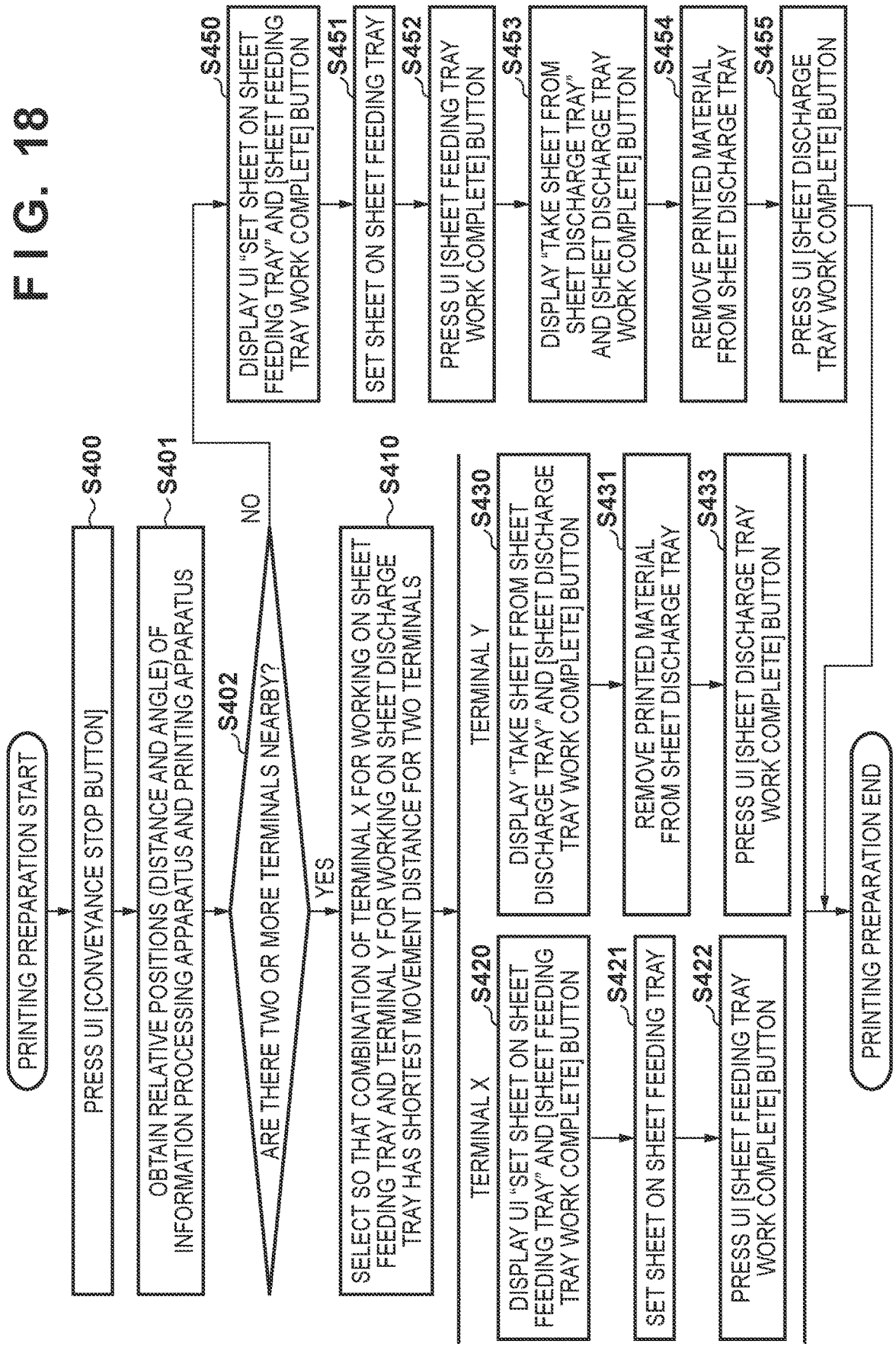
FIG. 18 is a flowchart showing the pre-print process in the case of issuing an instruction to a plurality of operators.
Figures 19A, 19B, 19C:
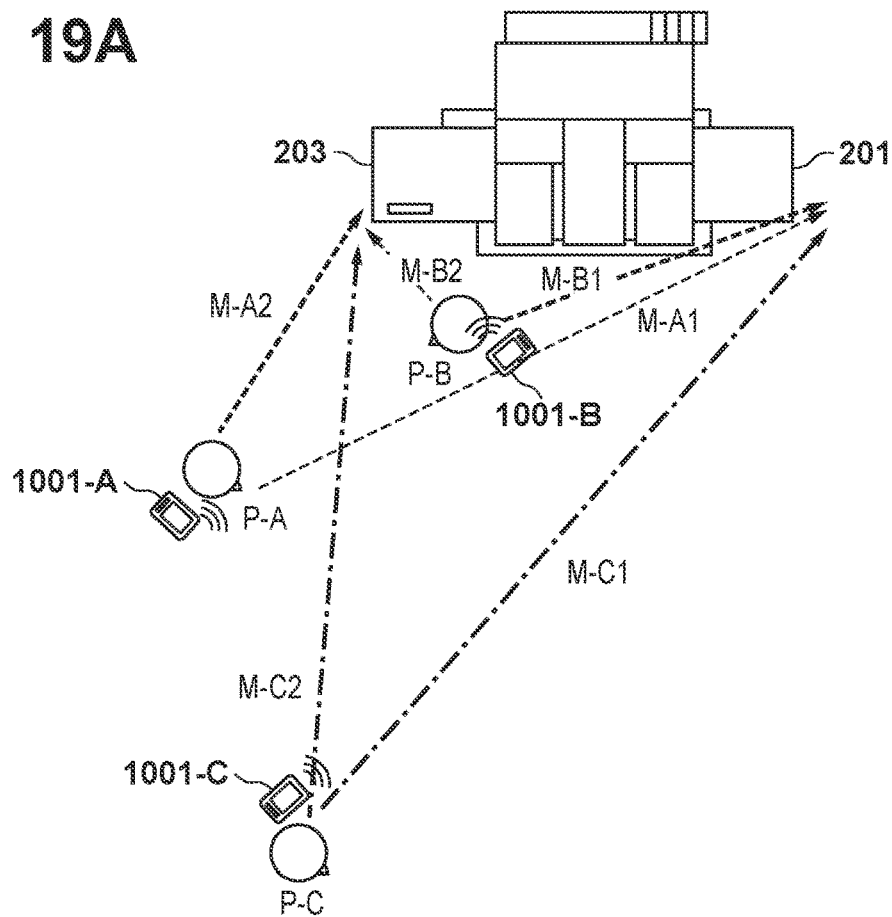
FIGS. 19A, 19B, and 19C show operator flow lines and UI displays showing a pre-print process when issuing instructions to a plurality of operators.

In the apparatus configuration of the first embodiment, taking as an example printing preparation operations, description is given regarding a method of reducing movement time by optimizing a flow line of an operator between the modules when a plurality of operators execute operations on modules at a plurality of locations in parallel. That is, in this embodiment, based on respective associations between a plurality of units such as a sheet feeding unit and a sheet discharge unit to be operated and a plurality of terminal apparatuses, and a terminal apparatus and a unit are associated with each other so that a sum of distances between associated units and the terminal apparatuses becomes shorter. A message is outputted based on these associations. FIG. 18 is a flowchart, FIG. 19A is a top view showing flow lines of operators, and FIG. 19B and FIG. 19C are UI displays of a terminal. In this example, there are three operators, their respective positions are P-A, P-B, and P-C, and there are two operations executed in parallel: work with respect to the sheet feeding tray and work with respect to the sheet discharge tray.

First, any one of the operators presses the "conveyance stop button" of the UI of the information processing apparatus 1001 that they themself hold, and the information processing apparatus 1001 accepts the press in step S400. Next, in step S401, the printing apparatus obtains the relative positions (distances and angles or orthogonal coordinates) of all the information processing apparatuses 1001 and the printing apparatus using BLE as described above. This may be done as per the overview described with FIG. 14. In step S402, the printing apparatus determines whether there are two or more peripheral terminals, in other words information processing apparatuses 1001 for which it was possible to obtain relative positions. If so, a combination of a terminal X, which is the information processing apparatus for performing work on the sheet feeding tray, and the terminal Y, which is for performing work on the sheet discharge tray, is selected from these information processing apparatuses so that the movement distance of the two terminals becomes the shortest. Regarding the manner of the selection, for example, very simply the total of the movement distances when each information processing apparatus 1001 is assigned to each piece of work may be obtained for all combinations of the information processing apparatuses 1001 and the work, and a combination in which the total of the moving distances is a minimum may be adopted. However, it is assumed that one piece of work is allocated to one information processing apparatus 1001. In this example, the terminal X is the information processing apparatus 1001-B, and the terminal Y is the information processing apparatus 1001-A.

When the allocation is determined, information indicating the combination of the information processing apparatuses 1001 and the work is transmitted to at least the information processing apparatuses 1001 which are the selected terminals X and Y. In this example, the information is transmitted to all the peripheral information processing apparatuses 1001. The UI of each information processing apparatus 1001 which has received this displays all operations (in this example, two operations: work with respect to the sheet feeding tray and work with respect to the sheet discharge tray) as shown in FIG. 19B, and displays the information processing apparatuses 1001 selected as the terminal X and the terminal Y for respective pieces of work. Including display of this UI, the operator having the terminal X performs an operation with respect to the sheet feeding tray in step S420 to step S422. Step S420 to step S422 are similar to step S113 to S115 of FIG. 12. In parallel with this, the operator having the terminal X performs an operation with respect to the sheet discharge tray in step S430 to step S432. Step S430 to step S432 are similar to step S110 to S112 of FIG. 12. At this time, for example, when the work on the sheet feeding tray is completed in step S422 and the work end button is pressed, that the button has been pressed is transmitted to the printing apparatus and transmitted from the printing apparatus to all the information processing apparatuses 1001. In the UI of the information processing apparatus 1001 which has received this, a display indicating that work with respect to the sheet feeding tray has completed is made, as in FIG. 19C. Because no operation to be performed preferentially is generated for an operator having an information processing apparatus 1001 (in the present example, the information processing apparatus 1001-C) that has not been selected as either the terminal X or the terminal Y, something to that effect may also be displayed on the user interface. Other work are similarly displayed in the user interface.

When there is one information processing apparatus 1001 for which the relative position was possible to obtain in step S402, step S450 to step S455 are executed, and this procedure is equivalent to the process of step S120 to step S125 in FIG. 10 of the first embodiment, and therefore description thereof is omitted here.

As described above, it is possible to reduce the downtime in overall operation by allocating an operation to each optimum module based on the position information of each of the plurality of operators. In this example, there are two operations executed in parallel, but there may be three or more operations. In this case, the number of terminals to be selected can be less than or equal to the smaller one of the number of operations to be executed in parallel and the number of information processing apparatuses 1001. For example, when the number of operations is four and the number of information processing apparatuses 1001 is three, it is possible to have the number of terminals to be selected be three or less.

The distribution of processing in the flowcharts described in the first to third embodiments does not have to be as described, and distribution can be appropriately made between an information processing apparatus and the printing apparatus. However, at a time of distribution of processing, when the subject performing the processing step does not have information necessary for the processing step, the necessary information may be obtained by performing transmission and reception of the information using short-range wireless communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103179, filed May 31, 2019 which is hereby incorporated by reference herein in its entirety.

What is claimed is:

1. A terminal apparatus capable of communicating with a communication apparatus, comprising:

one or more processors; and
one or more memories storing instructions that, when executed by the one or more processors, cause the terminal apparatus to:
  specify a first distance between the terminal apparatus and a first unit in the communication apparatus, and a second distance between the terminal apparatus and a second unit in the communication apparatus; and
cause a display unit to
  display a first screen in a state that a second screen is not displayed by first display processing for displaying the first screen which relates to the first unit in preference to the second screen which relates to the second unit and display the second screen based on an operation of the first screen displayed in preference to the second screen in a case where the first distance is shorter than the second distance, and
  display the second screen in a state that the first screen is not displayed by second display processing for displaying the second screen in preference to the first screen and display the first screen based on an operation of the second screen displayed in preference to the first screen in a case where the second distance is shorter than the first distance.

2. The terminal apparatus according to claim 1, wherein the instructions when further executed by the one or more processors cause the terminal apparatus to specify a distance between the terminal apparatus and the communication apparatus in a case where an instruction to withdraw is received from the communication apparatus;

determine whether or not the distance between the terminal apparatus and the communication apparatus is greater than or equal to a predetermined distance; and transmit a withdrawal completion command to the communication apparatus when the determination unit determines that the distance between the terminal apparatus and the communication apparatus is greater than or equal to the predetermined distance, wherein an action of the communication apparatus is initiated based on the withdrawal completion command having been transmitted to the communication apparatus.

3. The terminal apparatus according to claim 1, wherein the communication apparatus has a print function, the first unit is a sheet feeding unit, and the second unit is a sheet discharge unit.

4. The terminal apparatus according to claim 1, wherein the first distance between the terminal apparatus and the first unit in the communication apparatus and the second distance between the terminal apparatus and the second unit in the communication apparatus are specified in accordance with communication based on Bluetooth.

5. A method of controlling a terminal apparatus capable of communicating with a communication apparatus, the method comprising:

specifying a first distance between the terminal apparatus and a first unit in the communication apparatus, and a second distance between the terminal apparatus and a second unit in the communication apparatus; and causing a display unit to
display a first screen in a state that a second screen is not displayed by first display processing for displaying the first screen which relates to the first unit in preference to the second screen which relates to the second unit and display the second screen based on an operation of the first screen displayed in preference to the second screen in a case where the first distance is shorter than the second distance, and display the second screen in a state that the first screen is not displayed by second display processing for displaying the second screen in preference to the first screen and display the first screen based on an operation of the second screen displayed in preference to the first screen in a case where the second distance is shorter than the first distance.

6. The method according to claim 5, further comprising:
specifying a distance between the terminal apparatus and the communication apparatus in a case where an instruction to withdraw is received from the communication apparatus;

determining whether or not the specified distance between the terminal apparatus and the communication apparatus is greater than or equal to a predetermined distance; and transmitting a withdrawal completion command to the communication apparatus when it is determined that the distance between the terminal apparatus and the communication apparatus is greater than or equal to the predetermined distance, wherein an action of the communication apparatus is initiated based on the withdrawal completion command having been transmitted to the communication apparatus.

7. The method according to claim 5, wherein
the communication apparatus has a print function, the first unit is a sheet feeding unit, and the second unit is a sheet discharge unit.

8. The method according to claim 5, wherein
the first distance between the terminal apparatus and the first unit in the communication apparatus and the second distance between the terminal apparatus and the second unit in the communication apparatus are specified in accordance with communication based on Bluetooth.

9. A non-transitory computer-readable storage medium storing a program related to a method of controlling a terminal apparatus capable of communicating with a communication apparatus, the method comprising:

specifying a first distance between the terminal apparatus and a first unit in the communication apparatus, and a second distance between the terminal apparatus and a second unit in the communication apparatus; and causing a display unit to
display a first screen in a state that a second screen is not displayed by first display processing for displaying the first screen which relates to the first unit in preference to a second screen which relates to the second unit and display the second screen based on an operation of the first screen displayed in preference to the second screen in a case where the first distance is shorter than the second distance, and display the second screen in a state that the first screen is not displayed by second display processing for displaying the second screen in preference to the first screen and display the first screen based on an operation of the second screen displayed in preference to the first screen in a case where the second distance is shorter than the first distance.

10. The storage medium according to claim 9, wherein the method further comprises:

specifying a distance between the terminal apparatus and the communication apparatus in a case where an instruction to withdraw is received from the communication apparatus;

determining whether or not the specified distance between the terminal apparatus and the communication apparatus is greater than or equal to a predetermined distance, and transmitting a withdrawal completion command to the communication apparatus when it is determined that the distance between the terminal apparatus and the communication apparatus is greater than or equal to the predetermined distance, wherein an action of the communication apparatus is initiated based on the withdrawal completion command having been transmitted to the communication apparatus.

11. The storage medium according to claim 9, wherein
the communication apparatus has a print function, the first unit is a sheet feeding unit, and the second unit is a sheet discharge unit.

12. The storage medium according to claim 9, wherein
the first distance between the terminal apparatus and the first unit in the communication apparatus and the second distance between the terminal apparatus and the second unit in the communication apparatus are specified in accordance with communication based on Bluetooth.

13. The terminal apparatus according to claim 3, wherein
a message prompting setting a sheet in the sheet feeding unit and a first button for inputting that a user has completed a work for the sheet feeding tray are displayed on the first screen, and the second screen is displayed in a case where the user operates the first button, and wherein
a message prompting removing a sheet in the sheet discharging unit and a second button for inputting that a user has completed a work for the sheet discharging tray are displayed on the second screen.

14. The method according to claim 7, wherein
a message prompting setting a sheet in the sheet feeding unit and a first button for inputting that a user has completed a work for the sheet feeding tray are displayed on the first screen, and the second screen is displayed in a case where the user operates the first button, and wherein
a message prompting removing a sheet in the sheet discharging unit and a second button for inputting that a user has completed a work for the sheet discharging tray are displayed on the second screen.

15. The storage medium according to claim 11, wherein
a message prompting setting a sheet in the sheet feeding unit and a first button for inputting that a user has completed a work for the sheet feeding tray are displayed on the first screen, and the second screen is displayed in a case where the user operates the first button, and wherein
a message prompting removing a sheet in the sheet discharging unit and a second button for inputting that a user has completed a work for the sheet discharging tray are displayed on the second screen.

* * * * *